US012218761B2

(12) United States Patent
Hosseini et al.

(10) Patent No.: US 12,218,761 B2
(45) Date of Patent: Feb. 4, 2025

(54) HYBRID AUTOMATIC REPEAT REQUEST FEEDBACK FOR LOW LATENCY TRANSMISSIONS

(71) Applicant: QUALCOMM Incorporated, San Diego, CA (US)

(72) Inventors: Seyedkianoush Hosseini, San Diego, CA (US); Amir Aminzadeh Gohari, Sunnyvale, CA (US); Wei Yang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,203

(22) Filed: Oct. 30, 2019

(65) Prior Publication Data

US 2020/0145144 A1 May 7, 2020

Related U.S. Application Data

(60) Provisional application No. 62/755,379, filed on Nov. 2, 2018.

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 5/0055* (2013.01); *H04W 72/0446* (2013.01);
(Continued)

(58) Field of Classification Search
CPC ... H04L 1/1664; H04L 1/1819; H04L 1/1854; H04L 1/1864; H04L 1/1896;
(Continued)

(56) References Cited

U.S. PATENT DOCUMENTS 8,861,408 B2   10/2014   Damnjanovic et al.
11,997,042 B2 *  5/2024   Yin ...................... H04L 5/0055
(Continued)

FOREIGN PATENT DOCUMENTS

CN   107852718 A      3/2018
CN   110830204 B  *   4/2022   ........... H04L 1/1861
(Continued)

OTHER PUBLICATIONS

Medles eta al., "Solutions for PUCCH HARQ-ACK Processing Time", Mar. 30, 2018, MediaTek, U.S. Appl. No. 62/650,460, filed Mar. 30, 2018, Toatal pp. 10 (Year: 2018).*
(Continued)

*Primary Examiner* — Shah M Rahman
(74) *Attorney, Agent, or Firm* — Guang Y. Zhang; Holland & Hart LLP

(57) ABSTRACT

Methods, systems, and devices for wireless communication are described. Generally, the described techniques provide for avoiding collisions between hybrid automatic repeat request (HARQ) feedback transmissions and between HARQ feedback transmissions and other transmissions. In one example, a base station may configure resources for HARQ feedback transmissions such that the resources are exclusive of each other to avoid collisions between HARQ feedback transmissions. In another example, a base station may indicate resources for a user equipment (UE) to use for HARQ feedback transmissions such that the resources are exclusive of each other to avoid collisions between HARQ feedback transmissions. In yet another example, if a HARQ feedback transmission and another transmission are scheduled on overlapping resources, a UE may be configured to multiplex bits of the HARQ feedback transmission and the other transmission or drop the other transmission.

22 Claims, 17 Drawing Sheets

(51) Int. Cl.
*H04W 72/0446* (2023.01)
*H04W 72/21* (2023.01)
*H04W 72/23* (2023.01)
*H04W 76/27* (2018.01)

(52) U.S. Cl.
CPC ........... *H04W 72/21* (2023.01); *H04W 72/23* (2023.01); *H04W 76/27* (2018.02)

(58) Field of Classification Search
CPC ............ H04L 5/0055; H04W 72/0413; H04W 72/0446; H04W 72/14; H04W 76/27; H04W 72/21; H04W 72/23
See application file for complete search history.

(56) References Cited

U.S. PATENT DOCUMENTS

| | | | |
|---|---|---|---|
| 2012/0155337 A1 | 6/2012 | Park | |
| 2013/0301433 A1* | 11/2013 | Yin | H04W 16/02 370/252 |
| 2013/0301600 A1* | 11/2013 | Park | H04W 72/042 370/329 |
| 2014/0092865 A1* | 4/2014 | Heo | H04W 8/08 370/331 |
| 2014/0269452 A1* | 9/2014 | Papasakellariou | H04L 5/0055 370/280 |
| 2015/0200762 A1* | 7/2015 | Kim | H04W 52/146 370/329 |
| 2016/0029365 A1 | 1/2016 | Papasakellariou et al. | |
| 2016/0080131 A1 | 3/2016 | Terry et al. | |
| 2017/0164226 A1* | 6/2017 | Wei | H04W 72/085 |
| 2017/0288819 A1 | 10/2017 | Chen et al. | |
| 2017/0346605 A1 | 11/2017 | Chendamarai Kannan et al. | |
| 2018/0145796 A1* | 5/2018 | Liang | H04L 1/1861 |
| 2018/0167126 A1* | 6/2018 | Wiberg | H04L 1/1854 |
| 2019/0306865 A1* | 10/2019 | Medles | H04L 1/1825 |
| 2020/0007296 A1* | 1/2020 | Papasakellariou | H04L 5/0053 |
| 2020/0059327 A1* | 2/2020 | Kini | H04L 1/1812 |
| 2020/0236732 A1* | 7/2020 | Liu | H04L 5/0094 |
| 2020/0367244 A1* | 11/2020 | Yang | H04L 1/1861 |
| 2020/0367265 A1* | 11/2020 | Wang | H04L 5/0055 |
| 2021/0152295 A1* | 5/2021 | Falconetti | H04L 1/1812 |
| 2021/0185682 A1* | 6/2021 | Lee | H04W 72/0493 |
| 2021/0218539 A1* | 7/2021 | Hu | H04L 1/1854 |
| 2021/0235482 A1* | 7/2021 | Yoshioka | H04W 72/1257 |
| 2021/0306107 A1* | 9/2021 | Yin | H04W 72/23 |
| 2021/0314105 A1* | 10/2021 | Gao | H04L 1/1671 |
| 2021/0320761 A1* | 10/2021 | Yang | H04L 1/1887 |
| 2021/0409182 A1* | 12/2021 | Lee | H04L 1/1864 |
| 2022/0006570 A1* | 1/2022 | Lee | H04L 1/1861 |
| 2022/0038242 A1* | 2/2022 | Yoshioka | H04L 5/0055 |
| 2023/0047403 A1* | 2/2023 | Xiong | H04W 72/21 |

FOREIGN PATENT DOCUMENTS

| | | | | |
|---|---|---|---|---|
| TW | 201806344 A | 2/2018 | | |
| WO | WO-2012061257 | 5/2012 | | |
| WO | WO-2017205669 A1 | 11/2017 | | |
| WO | WO-2019215934 A1 * | 11/2019 | ........... | H04W 28/04 |
| WO | WO-2020026451 A1 * | 2/2020 | ............... | H04L 1/08 |

OTHER PUBLICATIONS

International Search Report and Written Opinion—PCT/US2019/059033—ISA/EPO—Apr. 20, 2020 (190333WO).
Partial International Search Report—PCT/US2019/059033—ISA/EPO—Feb. 17, 2020 (190333WO).
Taiwan Search Report—TW108139457—TIPO—Nov. 16, 2022 (190333TW).
Taiwan Search Report—TW112126653—TIPO—Mar. 5, 2024 (190333TWD1).

* cited by examiner

415 ▨ HARQ feedback resource configuration
420 ▦ Grant
425 ▓ Data transmission
430 ▩ HARQ feedback transmission

400

HYBRID AUTOMATIC REPEAT REQUEST FEEDBACK FOR LOW LATENCY TRANSMISSIONS

CROSS REFERENCE

The present application for patent claims the benefit of U.S. Provisional Patent Application No. 62/755,379 by HOSSEINI, et al., entitled "HYBRID AUTOMATIC REPEAT REQUEST FEEDBACK FOR LOW LATENCY TRANSMISSIONS," filed Nov. 2, 2018, assigned to the assignee hereof, and expressly incorporated by reference herein.

BACKGROUND

The following relates generally to wireless communications and more specifically to hybrid automatic repeat request (HARQ) feedback for low latency transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to provide hybrid automatic repeat request (HARQ) feedback to a base station for data transmissions received from the base station. Conventional techniques for providing HARQ feedback may be deficient.

SUMMARY

The described techniques relate to improved methods, systems, devices, and apparatuses that support hybrid automatic repeat request (HARQ) feedback for low latency transmissions. Generally, the described techniques provide for avoiding collisions between HARQ feedback transmissions and between HARQ feedback transmissions and other transmissions. In one example, a base station may configure resources for HARQ feedback transmissions such that the resources are exclusive of each other to avoid collisions between HARQ feedback transmissions. In another example, a base station may indicate resources for a user equipment (UE) to use for HARQ feedback transmissions such that the resources are exclusive of each other to avoid collisions between HARQ feedback transmissions. In yet another example, if a HARQ feedback transmission and another transmission are scheduled on overlapping resources, a UE may multiplex bits of the HARQ feedback transmission and the other transmission, or the UE may drop the other transmission.

A method for wireless communication at a user equipment is described. The method may include identifying a configuration of acknowledgement/negative acknowledgement (ACK/NACK) resource sets across a set of sub-slots in a slot, receiving a first data transmission in a first data channel from a base station and a second data transmission in a second data channel from the base station, receiving an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmitting the feedback for the first data transmission on the first resource set and the feedback for the second data transmission on the second resource set.

An apparatus for wireless communication at a user equipment is described. The apparatus may include a processor, memory in electronic communication with the processor, and instructions stored in the memory. The instructions may be executable by the processor to cause the apparatus to identify a configuration of ACK/NACK resource sets across a set of sub-slots in a slot, receive a first data transmission in a first data channel from a base station and a second data transmission in a second data channel from the base station, receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmit the feedback for the first data transmission on the first resource set and the feedback for the second data transmission on the second resource set.

Another apparatus for wireless communication at a user equipment is described. The apparatus may include means for identifying a configuration of ACK/NACK resource sets across a set of sub-slots in a slot, receiving a first data transmission in a first data channel from a base station and a second data transmission in a second data channel from the base station, receiving an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmitting the feedback for the first data transmission on the first resource set and the feedback for the second data transmission on the second resource set.

A non-transitory computer-readable medium storing code for wireless communication at a user equipment is described. The code may include instructions executable by a processor to identify a configuration of ACK/NACK resource sets across a set of sub-slots in a slot, receive a first data transmission in a first data channel from a base station and a second data transmission in a second data channel from the base station, receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmit the feedback for the first data transmission on the first resource set and the feedback for the second data transmission on the second resource set.

In some examples of the method, apparatuses, and non-transitory computer-readable medium described herein, identifying the configuration of ACK/NACK resource sets across the set of sub-slots in the slot may include operations, features, means, or instructions for identifying that each ACK/NACK resource set may be completely within respective sub-slots of the slot such that the first resource set and the second resource set may be each exclusive of each other in the time domain based on the configuration of the ACK/NACK resource sets, and where resource sets may be configured for providing feedback such that none of the resource sets overlap and collisions between feedback transmissions may be avoided.

In some examples of the method, apparatuses, and non-transitory computer-readable medium described herein, receiving the indication of the first resource set and the second resource set may include operations, features, means, or instructions for receiving one or more feedback timing parameters with the first data transmission and the second data transmission, the one or more feedback timing parameters indicating the first resource set and the second resource set such that the first resource set and the second resource set may be each exclusive of each other in the time domain even if the configuration of ACK/NACK resource sets includes overlapping resource sets.

In some examples of the method, apparatuses, and non-transitory computer-readable medium described herein, identifying the configuration of the set of ACK/NACK resource sets may include operations, features, means, or instructions for receiving, from the base station, the configuration of the set of ACK/NACK resource sets via radio resource control (RRC) signaling. In some examples of the method, apparatuses, and non-transitory computer-readable medium described herein, receiving the indication of the first resource set and the second resource set may include operations, features, means, or instructions for receiving one or more acknowledgment (ACK) negative-acknowledgement (NACK) resource indicators (ARIs).

A method for wireless communication at a base station is described. The method may include transmitting, to a UE, a configuration of ACK/NACK resource sets across a set of sub-slots in a slot, transmitting a first data transmission in a first data channel to the UE and a second data transmission in a second data channel to the UE, transmitting an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receiving the feedback for the first data transmission on the first resource set and the feedback for the second data transmission on the second resource set.

An apparatus for wireless communication at a base station is described. The apparatus may include a processor, memory in electronic communication with the processor, and instructions stored in the memory. The instructions may be executable by the processor to cause the apparatus to transmit, to a UE, a configuration of ACK/NACK resource sets across a set of sub-slots in a slot, transmit a first data transmission in a first data channel to the UE and a second data transmission in a second data channel to the UE, transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receive the feedback for the first data transmission on the first resource set and the feedback for the second data transmission on the second resource set.

Another apparatus for wireless communication at a base station is described. The apparatus may include means for transmitting, to a UE, a configuration of ACK/NACK resource sets across a set of sub-slots in a slot, transmitting a first data transmission in a first data channel to the UE and a second data transmission in a second data channel to the UE, transmitting an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receiving the feedback for the first data transmission on the first resource set and the feedback for the second data transmission on the second resource set.

A non-transitory computer-readable medium storing code for wireless communication at a base station is described. The code may include instructions executable by a processor to transmit, to a UE, a configuration of ACK/NACK resource sets across a set of sub-slots in a slot, transmit a first data transmission in a first data channel to the UE and a second data transmission in a second data channel to the UE, transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receive the feedback for the first data transmission on the first resource set and the feedback for the second data transmission on the second resource set.

Some examples of the method, apparatuses, and non-transitory computer-readable medium described herein may further include operations, features, means, or instructions for determining the configuration of the ACK/NACK resource sets such that none of the ACK/NACK resource sets overlap to avoid collisions between feedback transmissions. Some examples of the method, apparatuses, and non-transitory computer-readable medium described herein may further include operations, features, means, or instructions for determining the first and second resource sets for the UE to use for providing feedback for the first and second data transmissions such that the first and second resource sets may be exclusive of each other in the time domain to avoid collisions between feedback transmissions.

In some examples of the method, apparatuses, and non-transitory computer-readable medium described herein, transmitting the configuration of the ACK/NACK resource sets may include operations, features, means, or instructions for transmitting the configuration of ACK/NACK resource sets via RRC signaling. In some examples of the method, apparatuses, and non-transitory computer-readable medium described herein, transmitting the indication of the first resource set and the second resource set may include operations, features, means, or instructions for transmitting one or more ARIs.

A method for wireless communication at a user equipment is described. The method may include receiving a first data transmission in a data channel from a base station, identifying ACK/NACK feedback to provide for the first data transmission in a first feedback transmission, determining that a first set of resources allocated for the first feedback transmission overlaps in a time domain with a second set of resources allocated for another transmission, and dropping the other transmission or multiplexing the first feedback transmission with the other transmission based on the determining.

An apparatus for wireless communication at a user equipment is described. The apparatus may include a processor, memory in electronic communication with the processor, and instructions stored in the memory. The instructions may be executable by the processor to cause the apparatus to receive a first data transmission in a data channel from a base station, identify ACK/NACK feedback to provide for the first data transmission in a first feedback transmission, determine that a first set of resources allocated for the first feedback transmission overlaps in a time domain with a second set of resources allocated for another transmission, and drop the other transmission or multiplexing the first feedback transmission with the other transmission based on the determining.

Another apparatus for wireless communication at a user equipment is described. The apparatus may include means for receiving a first data transmission in a data channel from a base station, identifying ACK/NACK feedback to provide for the first data transmission in a first feedback transmission, determining that a first set of resources allocated for the first feedback transmission overlaps in a time domain with a second set of resources allocated for another transmission, and dropping the other transmission or multiplexing the first feedback transmission with the other transmission based on the determining.

A non-transitory computer-readable medium storing code for wireless communication at a user equipment is described. The code may include instructions executable by a processor to receive a first data transmission in a data channel from a base station, identify ACK/NACK feedback to provide for the first data transmission in a first feedback transmission, determine that a first set of resources allocated for the first feedback transmission overlaps in a time domain with a second set of resources allocated for another transmission, and drop the other transmission or multiplexing the first feedback transmission with the other transmission based on the determining.

In some examples of the method, apparatuses, and non-transitory computer-readable medium described herein, the other transmission includes a second feedback transmission associated with a second data transmission, and the method, apparatuses, and non-transitory computer-readable medium described herein may further include operations, features, means, or instructions for determining that sufficient time may have passed for processing the first data transmission and the second data transmission, multiplexing ACK/NACK feedback bits of the first feedback transmission with ACK/NACK feedback bits of the second feedback transmission, and transmitting the multiplexed ACK/NACK feedback bits on a third set of resources in a multiplexed feedback transmission.

Some examples of the method, apparatuses, and non-transitory computer-readable medium described herein may further include operations, features, means, or instructions for receiving a grant for the first data transmission, the grant including an indication of the first set of resources for the first feedback transmission or the third set of resources for the multiplexed feedback transmission, and interpreting the indication in the grant as allocating the third set of resources for the multiplexed feedback transmission based on determining that the first set of resources overlaps in a time domain with the second set of resources.

In some examples of the method, apparatuses, and non-transitory computer-readable medium described herein, the interpreting the indication in the grant as allocating the third set of resources for the multiplexed feedback transmission may be further based on a first number of ACK/NACK feedback bits in the first feedback transmission and a second number of ACK/NACK feedback bits in the second feedback transmission. In some examples of the method, apparatuses, and non-transitory computer-readable medium described herein, the indication in the grant of ACK/NACK feedback resources includes an ARI.

In some examples of the method, apparatuses, and non-transitory computer-readable medium described herein, the first data transmission may be scheduled after the second data transmission. In some examples of the method, apparatuses, and non-transitory computer-readable medium described herein, each of the first set of resources, second set of resources, and third set of resources includes uplink control channel resources. In some examples of the method, apparatuses, and non-transitory computer-readable medium described herein, an uplink control channel resource corresponds to a control channel format and time and frequency resources. In some examples of the method, apparatuses, and non-transitory computer-readable medium described herein, the other transmission includes a semi-persistent or periodic transmission, and the method, apparatuses, and non-transitory computer-readable medium described herein may further include operations, features, means, or instructions for multiplexing ACK/NACK feedback bits of the first feedback transmission with bits of the semi-persistent or periodic transmission, and transmitting the multiplexed bits on a third set of resources in a multiplexed transmission.

Some examples of the method, apparatuses, and non-transitory computer-readable medium described herein may further include operations, features, means, or instructions for receiving a grant for the first data transmission, the grant including an indication of the first set of resources for the first feedback transmission or the third set of resources for the multiplexed transmission, and interpreting the indication in the grant as allocating the third set of resources for the multiplexed transmission based on determining that the first set of resources overlaps in a time domain with the second set of resources. In some examples of the method, apparatuses, and non-transitory computer-readable medium described herein, the indication in the grant of ACK/NACK feedback resources includes an ARI.

In some examples of the method, apparatuses, and non-transitory computer-readable medium described herein, the other transmission may include operations, features, means, or instructions for dropping the semi-persistent or periodic transmission, and transmitting the first feedback transmission. In some examples of the method, apparatuses, and non-transitory computer-readable medium described herein, dropping the semi-persistent or periodic transmission may include operations, features, means, or instructions for suspending the semi-persistent or periodic transmission.

In some examples of the method, apparatuses, and non-transitory computer-readable medium described herein, the other transmission includes an MBB transmission, and the method, apparatuses, and non-transitory computer-readable medium described herein may further include operations, features, means, or instructions for multiplexing ACK/NACK feedback bits of the first feedback transmission with bits of the MBB transmission, and transmitting the multiplexed bits on a third set of resources in a multiplexed transmission. In some examples of the method, apparatuses, and non-transitory computer-readable medium described herein, the other transmission may include operations, features, means, or instructions for dropping the MBB transmission on an MBB channel, and transmitting the first feedback transmission on a low latency channel.

In some examples of the method, apparatuses, and non-transitory computer-readable medium described herein, dropping the MBB transmission and transmitting the first feedback transmission may include operations, features, means, or instructions for refraining from transmitting at least a portion of the MBB transmission on the MBB channel that overlaps with the first feedback transmission, and transmitting the first feedback transmission on the low latency channel. In some examples of the method, apparatuses, and non-transitory computer-readable medium described herein, the MBB channel includes an uplink control channel with any control channel format.

In some examples of the method, apparatuses, and non-transitory computer-readable medium described herein, dropping the MBB transmission and transmitting the first feedback transmission may include operations, features, means, or instructions for puncturing a portion of the MBB transmission on the MBB channel that overlaps with the first feedback transmission with bits of the first feedback transmission. In some examples of the method, apparatuses, and non-transitory computer-readable medium described herein, the MBB channel includes an uplink control channel with control channel format two, three, or four.

In some examples of the method, apparatuses, and non-transitory computer-readable medium described herein, multiplexing the first feedback transmission with the other transmission may include operations, features, means, or instructions for multiplexing bits of the first feedback transmission with bits of the other transmission. Some examples of the method, apparatuses, and non-transitory computer-readable medium described herein may further include operations, features, means, or instructions for receiving an indication via RRC signaling of whether to drop the other transmission or multiplex the first feedback transmission with the other transmission.

A method for wireless communication at a base station is described. The method may include transmitting a grant to schedule a first data transmission for a user equipment (UE), the grant including an indication of a first set of resources allocated for a first feedback transmission for the data transmission and a second set of resources allocated for multiplexing the first feedback transmission with another transmission, and receiving the first feedback transmission for the data transmission on the first set of resources or the first feedback transmission multiplexed with the other transmission on the second set of resources.

An apparatus for wireless communication at a base station is described. The apparatus may include a processor, memory in electronic communication with the processor, and instructions stored in the memory. The instructions may be executable by the processor to cause the apparatus to identify a first data transmission to be transmitted to a UE, transmit a grant to schedule the first data transmission, the grant including an indication of a first set of resources allocated for a first feedback transmission for the data transmission and a second set of resources allocated for multiplexing the first feedback transmission with another transmission, and receive the first feedback transmission for the data transmission on the first set of resources or the first feedback transmission multiplexed with the other transmission on the second set of resources.

Another apparatus for wireless communication at a base station is described. The apparatus may include means for, transmitting a grant to schedule a first data transmission for a user equipment (UE), the grant including an indication of a first set of resources allocated for a first feedback transmission for the data transmission and a second set of resources allocated for multiplexing the first feedback transmission with another transmission, and receiving the first feedback transmission for the data transmission on the first set of resources or the first feedback transmission multiplexed with the other transmission on the second set of resources.

A non-transitory computer-readable medium storing code for wireless communication at a base station is described. The code may include instructions executable by a processor to identify a first data transmission to be transmitted to a UE, transmit a grant to schedule the first data transmission, the grant including an indication of a first set of resources allocated for a first feedback transmission for the data transmission and a second set of resources allocated for multiplexing the first feedback transmission with another transmission, and receive the first feedback transmission for the data transmission on the first set of resources or the first feedback transmission multiplexed with the other transmission on the second set of resources.

In some examples of the method, apparatuses, and non-transitory computer-readable medium described herein, the other transmission includes a second feedback transmission associated with a second data transmission, and the method, apparatus, and non-transitory computer readable medium described herein may further include operations, features, means, or instructions for receiving bits of the first feedback transmission multiplexed with bits of the second feedback transmission on the second set of resources, where the first set of resources allocated for the first feedback transmission overlaps in a time domain with resources allocated for the second feedback transmission.

In some examples of the method, apparatuses, and non-transitory computer-readable medium described herein, the other transmission includes a semi-persistent or periodic transmission, and the method, apparatus, and non-transitory computer readable medium described herein may further include operations, features, means, or instructions for receiving bits of the first feedback transmission multiplexed with bits of the semi-persistent or periodic transmission on the second set of resources, where the first set of resources allocated for the first feedback transmission overlaps in a time domain with resources allocated for the semi-persistent or periodic transmission.

In some examples of the method, apparatuses, and non-transitory computer-readable medium described herein, the other transmission includes an MBB transmission, and the method, apparatus, and non-transitory computer readable medium described herein may further include operations, features, means, or instructions for receiving bits of the first feedback transmission multiplexed with bits of the MBB transmission on the second set of resources, where the first set of resources allocated for the first feedback transmission overlaps in a time domain with resources allocated for the MBB transmission.

Some examples of the method, apparatuses, and non-transitory computer-readable medium described herein may further include operations, features, means, or instructions for transmitting RRC signaling indicating that the UE may be to multiplex the first feedback transmission with the other transmission if the first set of resources allocated for the first feedback transmission overlaps with resources allocated for the other transmission. In some examples of the method, apparatuses, and non-transitory computer-readable medium described herein, the indication in the grant of ACK/NACK feedback resources includes an ARI.

DETAILED DESCRIPTION

Some wireless communications systems may support low latency communications between a user equipment (UE) and a base station. In some cases, the UE may be scheduled to provide HARQ feedback for multiple data transmissions received from a base station. To limit the latency associated with providing HARQ feedback, a UE may be configured with multiple uplink control channel resources in a slot for transmitting HARQ feedback. In particular, a slot may be split into multiple sub-slots, and each sub-slot may include an uplink control channel resource for HARQ feedback reporting for low latency communications (e.g., multiple uplink control channel resources may be configured in each sub-slot, and one of the uplink control channel resources would be used for HARQ feedback reporting in the sub-slot). In some cases, however, uplink control channel resources allocated for different HARQ feedback transmissions may overlap in a time domain, and HARQ feedback transmissions may collide. Further, an uplink control channel resource allocated for a HARQ feedback transmission may overlap in a time domain with resources allocated for another transmission, and the transmissions may collide.

As described herein, a wireless communications system may support efficient techniques for avoiding collisions between HARQ feedback transmissions and between HARQ feedback transmissions and other transmissions. In one example, a base station may configure resources for HARQ feedback transmissions such that the resources are exclusive of each other to avoid collisions between HARQ feedback transmissions. In some cases, the resources may not cross a sub-slot border. For example, configured PUCCH resources in a sub-slot of a given HARQ-ACK codebook may not cross the sub-slot borders (e.g., the resources may be fully contained within the same sub-slot). In another example, a base station may indicate resources for a UE to use for HARQ feedback transmissions such that the resources are exclusive of each other to avoid collisions between HARQ feedback transmissions. In yet another example, if a HARQ feedback transmission and another transmission are scheduled on overlapping resources, a UE may be configured to multiplex bits of the HARQ feedback transmission and the other transmission, or drop the other transmission.

Aspects of the disclosure are described herein in the context of a wireless communications system. Examples of processes and signaling exchanges that support HARQ feedback for low latency transmissions are then described. Aspects of the disclosure are further illustrated by and described with reference to apparatus diagrams, system diagrams, and flowcharts that relate to HARQ feedback for low latency transmissions.

Figure 1:
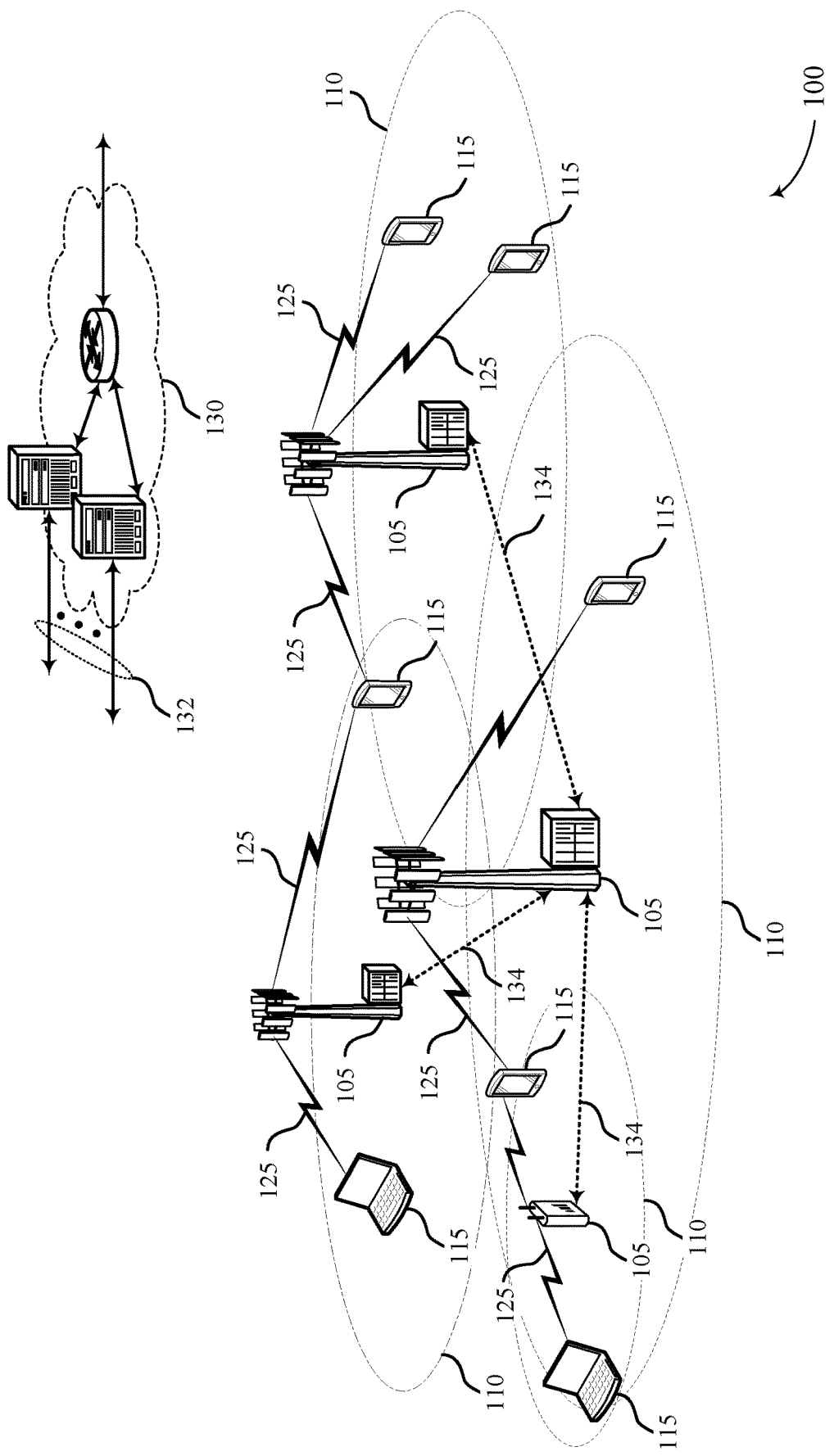
FIG. 1 illustrates an example of a wireless communications system that supports hybrid automatic repeat request (HARQ) feedback for low latency transmissions in accordance with aspects of the present disclosure.

FIG. 1 illustrates an example of a wireless communications system 100 that supports HARQ feedback for low latency transmissions in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support mobile broadband (MBB) communications, enhanced MBB (eMBB) communications, ultra-reliable (e.g., mission critical) communications, low latency communications, ultra-reliable low latency communications (URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA).

Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period).

Excluding the cyclic prefix, each symbol period may contain 2048 sampling periods. In some wireless communications systems, a slot may further be divided into multiple mini-slots containing one or more symbols. Each symbol may vary in duration depending on the subcarrier spacing or frequency band of operation. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). For instance, a mini-slot may be the smallest unit of scheduling.

In some cases, UEs 115 and base stations 105 may support retransmissions of data to increase the likelihood that data is received successfully. HARQ feedback (e.g., a form of acknowledgment (ACK) or negative-acknowledgment (NACK) feedback) is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE may be configured to transmit HARQ feedback on one PUCCH resource per slot (e.g., although the UE may be configured with up to two PUCCH resources in a slot). In such systems, the UE may provide HARQ feedback for multiple data transmissions in the slot. However, since the UE may have to allow time for processing all of the data transmissions (e.g., including a last data transmission of the multiple data transmissions), the HARQ feedback for some data transmissions may be delayed.

Figure 2:
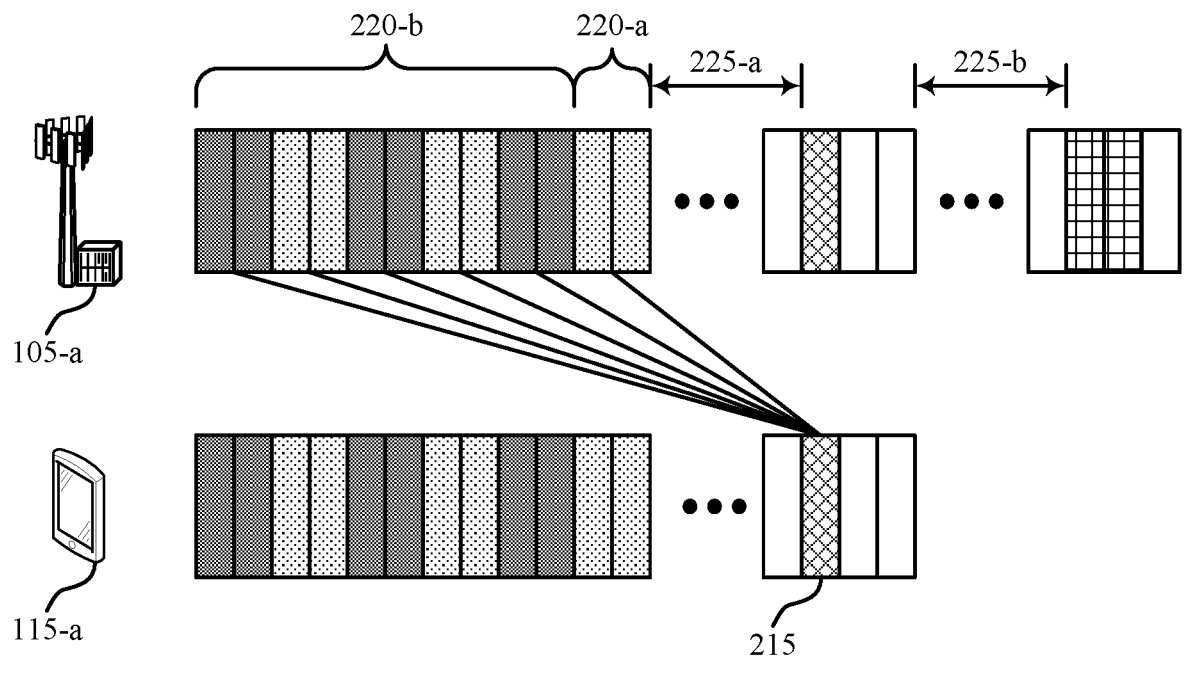
FIG. 2 illustrates an example of a HARQ feedback timeline for a HARQ feedback transmission in a slot for multiple data transmissions on mini-slots in accordance with aspects of the present disclosure.

FIG. 2 illustrates an example of HARQ feedback timeline 200 for a HARQ feedback transmission 205 in a slot for multiple data transmissions 210 on mini-slots 220 (e.g., seven two symbol mini-slots per slot) in accordance with aspects of the present disclosure. In the example of FIG. 2, UE 115-*a* may receive a grant for each of the data transmissions 210, and UE 115-*a* may receive each data transmission 210 based on the grant. Each grant may indicate that the UE 115-*a* is to provide a HARQ feedback transmission 205 for a corresponding data transmission 210 on a PUCCH resource in symbol 215. However, since UE 115-*a* may have to finish processing the last data transmission 210 on mini-slot 220-*a* before transmitting HARQ feedback for data transmissions 210 on other mini-slots 220-*b*, the latency of HARQ feedback for the data transmissions on the other mini-slots 220-*b* may increase (e.g., although the minimum timeline 225-*a* may be guaranteed for the data transmission 210 on the last mini-slot 220-*a* of the slot).

In one example, for a subcarrier spacing of 15 kHz, an average round-trip time (RTT) for HARQ feedback may be 2.98 ms, a best-case RTT for HARQ feedback may be 2.55 ms (e.g., for the data transmission 210 in the last mini-slot 220-*a*), and a worst-case RTT for HARQ feedback may be 3.4 ms. In another example, for a subcarrier spacing of 30 kHz, an average RTT for HARQ feedback may be 1.49 ms, a best-case RTT for HARQ feedback may be 1.27 ms (e.g., for the data transmission 210 in the last mini-slot 220-*a*), and a worst-case RTT for HARQ feedback may be 1.7 ms. The increased latency of the HARQ feedback transmissions for some data transmissions may be a result of mapping HARQ feedback for multiple data transmissions to a single PUCCH resource. If more PUCCH resources are available for HARQ feedback transmissions, however, latency may be reduced (e.g., the worst-case RTT in the examples herein may be reduced). Further, if the mapping of HARQ feedback for data transmissions to PUCCH resources is 1-1, then the HARQ feedback for each data transmission may be at a minimum (e.g., equal to the best-case RTT in the examples herein).

Accordingly, in wireless communications system 100, a UE 115 may be configured to transmit HARQ feedback on multiple PUCCH resources per slot for low latency communications (e.g., to reduce the latency of HARQ feedback transmissions). For example, a slot may be split into multiple sub-slots, and each sub-slot may include a PUCCH resource for HARQ feedback reporting for low latency communications (e.g., multiple uplink control channel resources may be configured in each sub-slot, and one of the uplink control channel resources would be used for HARQ feedback reporting in the sub-slot).

Figure 3:
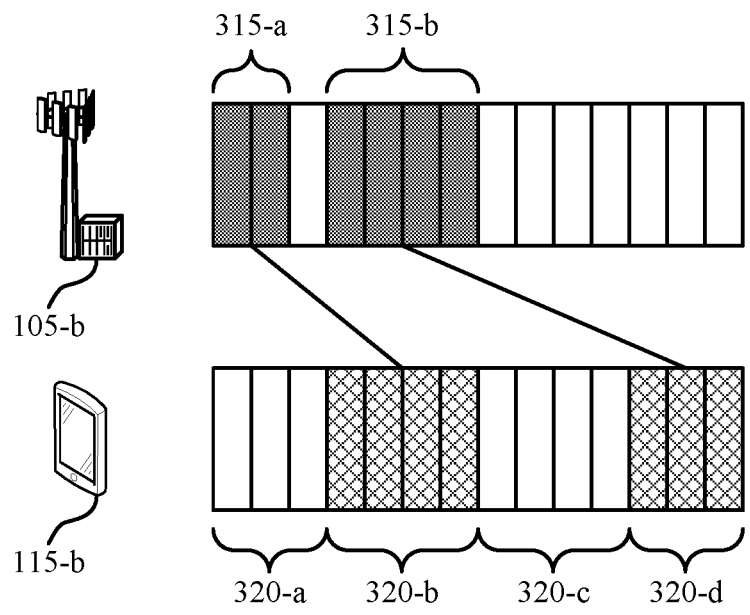
FIG. 3 illustrates an example of HARQ feedback timelines for multiple HARQ feedback transmissions in multiple sub-slots of a slot in accordance with aspects of the present disclosure.

FIG. 3 illustrates an example of HARQ feedback timelines 300 for multiple HARQ feedback transmissions in multiple sub-slots of a slot in accordance with aspects of the present disclosure. When base station 105-*b* schedules a data transmission 305, the base station 105-*b* may transmit a grant for the data transmission 305, and the grant may include an indication of a PUCCH resource to be used by UE 115-*a* for HARQ reporting. In particular, the grant for a data transmission may include an ACK/NACK resource indicator (ARI), and the ARI (e.g., in combination with an index of a first control channel element (CCE) on which a PDCCH that includes the grant is received) may indicate the PUCCH resource to be used by UE 115-*a* for reporting HARQ feedback for the data transmission.

The ARI received in the grant for a data transmission may include a value K1 (e.g., in units of sub-slots) which may indicate a specific sub-slot that includes the PUCCH resource for the UE 115-*b* to use for transmitting HARQ feedback for the data transmission. The value K1 may indicate a number of sub-slots after which the UE 115-*b* may provide HARQ feedback based on a sub-slot in which a last symbol of a data transmission is received (e.g., the reference point for each data transmission may be its last symbol). That is, even if a starting symbol of a data transmission is in sub-slot X, the UE 115-*a* may determine that the data transmission is received in sub-slot X+1 if the last symbol of the data transmission is received in sub-slot X+1 (e.g., the allocation for the data transmission may be flexible and may start and end anywhere in a slot with no constraint relative to sub-slots). This interpretation of the timing of the data transmission may allow sufficient time for processing the data transmission (e.g., may allow UE 115-*a* to maintain the processing timeline for the data transmission).

In one example, for a data transmission 305 on symbols 315-*a*, the ARI may include a K1 value of one. Thus, since a last symbol of the data transmission 305 may be received in sub-slot 320-*a*, UE 115-*a* may determine to transmit HARQ feedback in sub-slot 320-*b* (e.g., on a PUCCH resource with a first symbol in sub-slot 320-*b*). In another example, for a data transmission 305 on symbols 315-*b*, the ARI may include a K1 value of two. Thus, since a last symbol of the data transmission 305 may be received in sub-slot 320-*b*, UE 115-*b* may determine to transmit HARQ feedback in sub-slot 320-*d*. In some cases, in a particular sub-slot, UE 115-*b* may look back at data transmissions received in a predetermined number of sub-slots to determine whether HARQ feedback for those data transmissions is to be transmitted in the sub-slot (e.g., to determine a codebook size for the HARQ transmission, where the codebook size determination for MBB and URLLC operations may be performed separately).

In addition to the allocation flexibility of resources for data transmissions, the allocation of PUCCH resources may also be flexible. For example, although the allocation of a PUCCH resource may start in a sub-slot (e.g., such that each sub-slot includes a PUCCH), the allocation of the PUCCH resource may end anywhere (e.g., in the same sub-slot or another sub-slot). This flexibility in allocating a PUCCH resource may allow sufficient time for processing a data transmission prior to providing HARQ feedback for the data transmission in the PUCCH resource (e.g., may allow UE 115-*a* to maintain the processing timeline, where the processing timeline may correspond to a gap between the last symbol of a data transmission and the first symbol of a HARQ feedback transmission for the data transmission). In some cases, however, a PUCCH resource indicated by an ARI to be used for a HARQ transmission in one sub-slot may overlap with another PUCCH resource indicated by another ARI to be used for another HARQ transmission.

In some cases, PUCCH transmissions may be from the sub-slots of the same HARQ codebook, or from different HARQ codebooks. In a first example, PUCCH resources that may be used by the UE are associated with different sub-slots of the same HARQ-ACK codebook and, according to the first example, the PUCCH resources may be overlapping. In such examples, a UE may be configured to multiplex the PUCCH resources, or the UE may treat the overlapping resources as an error event. In a second example, the overlapping PUCCH resources may be associated with sub-slots of different HARQ-ACK codebooks. In accordance with the second example, a UE may be configured to drop one or more overlapping transmissions or PUCCH resources.

For example, if a PUCCH resource starts in one sub-slot (e.g., a first symbol of the PUCCH resource is in the sub-slot), the PUCCH resource may be considered to be in the sub-slot even though a last symbol of the PUCCH resource may be in another sub-slot and may overlap with another PUCCH resource in the other sub-slot. In this example, the PUCCH resource allocated for a HARQ feedback transmission for a low latency data transmission may overlap in a time domain with another PUCCH resource in another sub-slot allocated for another HARQ feedback transmission. In another example, the PUCCH resource allocated for the HARQ feedback transmission for a low latency data transmission may overlap with resources allocated for a semi-persistent or periodic transmission (e.g., a channel state information (CSI) transmission). In yet another example, the PUCCH resource allocated for the HARQ feedback transmission for a low latency data transmission may overlap in a time domain with resources allocated for an MBB transmission (e.g., a HARQ feedback MBB transmission or a semi-persistent or periodic MBB transmission). Since the PUCCH resource allocated for a HARQ feedback transmission may overlap with resources allocated for another transmission, the HARQ feedback transmission may collide with the other transmission. Wireless communications system 100 may support efficient techniques for avoiding collisions between transmissions.

Figure 4:
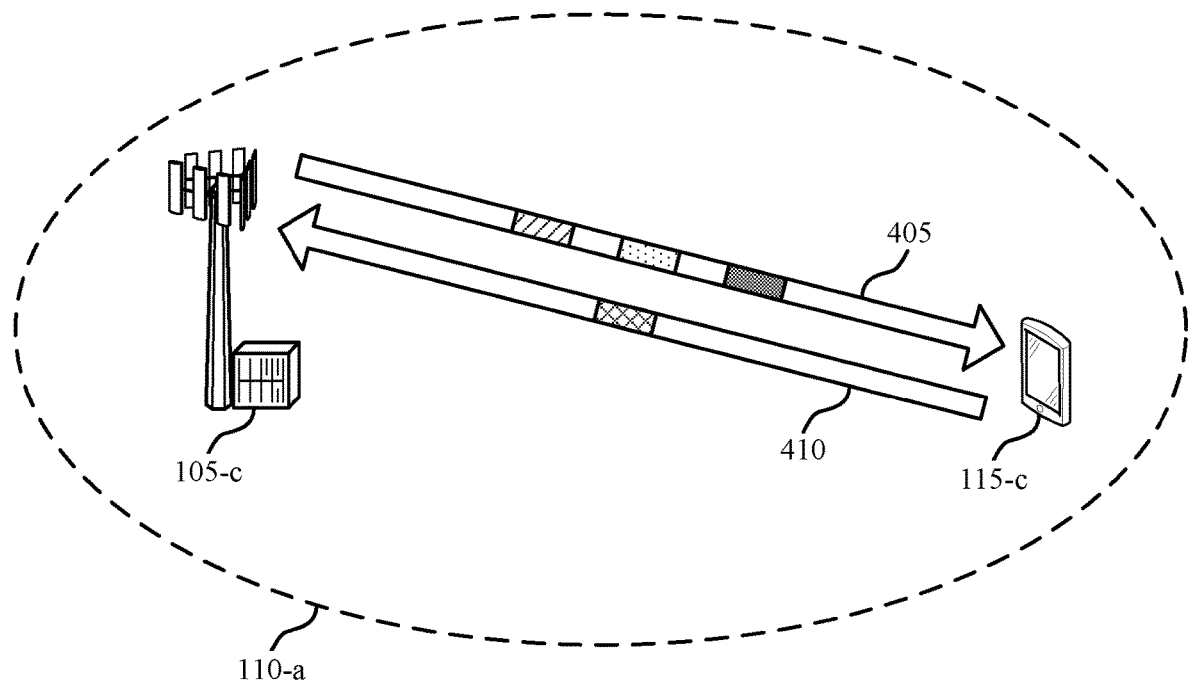
FIG. 4 illustrates an example of a wireless communications system that supports HARQ feedback for low latency transmissions in accordance with aspects of the present disclosure.

FIG. 4 illustrates an example of a wireless communications system 400 that supports HARQ feedback for low latency transmissions in accordance with aspects of the present disclosure. Wireless communications system 400 includes base station 105-*c*, which may be an example of a base station 105 described with reference with FIGS. 1-3. Wireless communications system 400 also includes UE 115-*c*, which may be an example of a UE 115 described with reference to FIGS. 1-3. Base station 105-*c* may provide communication coverage for a respective coverage area 110-*a*, which may be an example of a coverage area 110 described with reference to FIG. 1. Base station 105-*c* may communicate with UE 115-*a* on resources of a downlink carrier 405 and resources of an uplink carrier 410. In some cases, downlink carrier 405 and uplink carrier 410 may be the same carrier.

In the example of FIG. 4, base station 105-*c* may configure multiple HARQ feedback resource sets (or PUCCH resource sets) to be used by UE 115-*c* for HARQ reporting in a slot. For instance, base station 105-*c* may transmit a HARQ feedback resource configuration 415 (e.g., via RRC signaling) to configure the HARQ feedback resource sets. In some cases, base station 105-*c* may then identify data to transmit to UE 115-*a*. Thus, base station 105-*c* may transmit a grant 420 to UE 115-*c* to schedule a data transmission 425. The grant may indicate resources to be used for the data transmission 425, and the grant may also include an ARI which may indicate a PUCCH resource for UE 115-*c* to use to provide HARQ feedback for the data transmission. After transmitting the grant, base station 105-*c* may transmit the data transmission 425 to UE 115-*c*. UE 115-*c* may then process the data transmission 425 and transmit a HARQ feedback transmission 430 including HARQ feedback for the data transmission 425 on the PUCCH resource indicated by the ARI.

As described with reference to FIG. 1, in conventional systems, the PUCCH resource allocated for the HARQ feedback transmission 430 may overlap in a time domain with resources allocated for another transmission, resulting in collisions in a wireless communications system. Wireless communications system 400 may support efficient techniques for avoiding collisions between transmissions to improve throughput and reliability. In one example, base station 105-*c* may configure HARQ feedback resource sets such that the HARQ feedback resource sets are exclusive of each other in a time domain to avoid collisions between HARQ feedback transmissions in a slot. In particular, the base station 105-*c* may configure HARQ resource sets (or PUCCH resources) such that each of the HARQ resource sets (or PUCCH resources) are fully contained within a sub-slot (e.g., with a first and last symbol of the HARQ resource set (or PUCCH resource) being within a same sub-slot).

In another example, base station 105-*c* may indicate HARQ feedback resource sets to be used for HARQ feedback transmissions such that the HARQ feedback resource sets are exclusive of each other in a time domain to avoid collisions between HARQ feedback transmissions in a slot. In particular, base station 105-*c* may ensure that the ARIs transmitted in different grants for different data transmissions do not indicate that UE 115-*c* is to provide HARQ feedback on overlapping HARQ feedback resource sets. Thus, UE 115-*c* may avoid transmitting HARQ feedback on overlapping HARQ feedback resource sets (e.g., though overlapping HARQ feedback resource sets or HARQ feedback resource sets that are each not fully contained in a sub-slot may be configured by base station 105-*c* via HARQ feedback resource configuration 415). In this example, if UE 115-*c* receives ARIs that indicate that UE 115-*c* is to transmit HARQ feedback on overlapping HARQ feedback resource sets, UE 115-*c* may determine that there is an error.

In yet another example, if UE 115-*c* determines that overlapping HARQ feedback resource sets are allocated for HARQ feedback transmissions, UE 115-*c* may multiplex the HARQ feedback transmissions.

Figure 5:
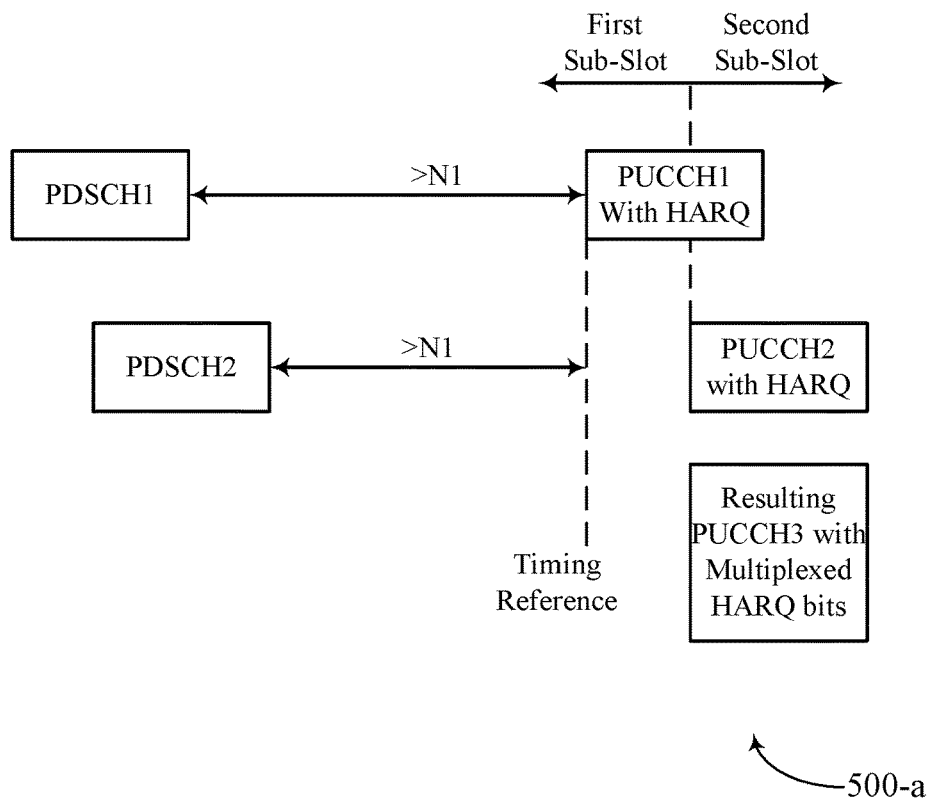
FIG. 5 illustrates an example of HARQ feedback transmission multiplexing in accordance with aspects of the present disclosure.
Figure 5:
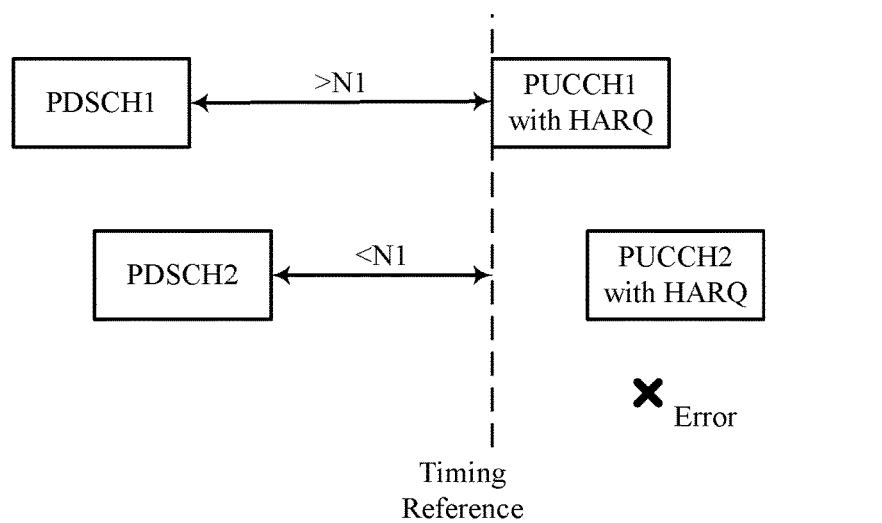

FIG. 5 illustrates an example of HARQ feedback transmission multiplexing 500 in accordance with aspects of the present disclosure. In the example of FIG. 5, base station 105-*c* may schedule a first data transmission (PDSCH 1) and a second data transmission (PDSCH 2), and base station 105-*c* may transmit a first grant for the first data transmission and a second grant for the second data transmission. Each grant may include an ARI (and implicit signaling) which may indicate a PUCCH resource for UE 115-*c* to use for providing HARQ feedback for a corresponding data transmission. For instance, a first ARI (and implicit signaling) for the first data transmission may indicate a first PUCCH resource (PUCCH 1) for UE 115-*c* to use for providing HARQ feedback for the first data transmission, and a second ARI (and implicit signaling) for the second data transmission may indicate a second PUCCH resource (PUCCH 2) for UE 115-*c* to use for providing HARQ feedback for the second data transmission.

In the example of FIG. 5, base station 105-*c* may determine that the first PUCCH resource overlaps with the second PUCCH resource (e.g., before transmitting the grant for the second data transmission). Thus, base station 105-*c* may transmit the ARI such that the ARI may indicate a third PUCCH resource (resulting PUCCH 3) for multiplexing the first HARQ feedback transmission and the second HARQ feedback transmission (e.g., though the ARI size may be the same). Accordingly, when UE 115-*c* determines that the first PUCCH resource overlaps with the second PUCCH resource, and UE 115-*c* determines to multiplex the first HARQ feedback transmission with the second HARQ feedback transmission, UE 115-*c* may interpret the ARI as allocating the third PUCCH resource for the multiplexed bits of the first and second HARQ feedback transmissions. In this case, the third PUCCH resource may be in a same sub-slot as the second PUCCH resource (e.g., the third PUCCH resource may be in the same sub-slot as the PUCCH resource associated with the data transmission that was scheduled last). If UE 115-*c* determines not to multiplex the first and second HARQ feedback transmissions, UE 115-*c* may interpret the ARI as allocating the second PUCCH resource.

In some cases, UE 115-*c* may multiplex the first HARQ feedback transmission and the second HARQ feedback transmission if the UE 115-*c* determines that sufficient time has passed for processing the first data transmission and the second data transmission. For instance, in a first example 500-*a* of FIG. 5, UE 115-*c* may identify a timing reference (e.g., immediately before a first PUCCH resource of the overlapping PUCCH resources (e.g., the PUCCH resource that precedes the other PUCCH resource)), and UE 115-*c* may determine, at that time, that sufficient time has passed for processing the first data transmission and the second data transmission (e.g., number of symbols since the last symbol of the first data transmission is greater than N1 (16 symbols) and the number of symbols since the last symbol of the second data transmission is greater than N1 (16 symbols)). Thus, UE 115-*c* may multiplex bits of the first HARQ feedback transmission with bits of the second HARQ feedback transmission on the third PUCCH resource. In a second example 500-*b* of FIG. 5, UE 115-*c* may identify a timing reference, and UE 115-*c* may determine, at that time, that sufficient time has not passed for processing one of the data transmissions (e.g., the second data transmission). Thus, UE 115-*c* may avoid multiplexing bits of the first HARQ feedback transmission with bits of the second HARQ feedback transmissions (e.g., UE 115-*c* may determine that there is an error).

The examples described herein relate to avoiding collisions between HARQ feedback transmissions from a UE 115-*c* for low latency data transmissions received by the UE 115-*c*. In other examples, however, a PUCCH resource allocated for a HARQ feedback transmission for a low latency data transmission may overlap with resources allocated for a semi-static or periodic transmission. In such examples, UE 115-*c* may multiplex bits of the HARQ feedback transmission for the low latency data transmission with bits of the semi-persistent or periodic transmission (e.g., using the same techniques described herein, when a latency requirement of the HARQ feedback is low or below a threshold). Alternatively, UE 115-*c* may drop the semi-static or periodic transmission. In some cases, base station 105-*c* may transmit an indication (e.g., via RRC signaling) of whether UE 115-*c* is to multiplex the transmissions or drop the semi-static or periodic transmission (e.g., whether to multiplex the transmissions or drop the semi-persistent or periodic transmission may be configurable).

In yet other examples, a PUCCH resource allocated for a HARQ feedback transmission for a low latency data transmission may overlap with resources allocated for an MBB transmission (e.g., where UE 115-*c* may determine whether a resource is allocated for a low latency transmission or an MBB transmission based on a PHY layer differentiation scheme or based on a configuration tag). In such examples, UE 115-*c* may multiplex bits of the HARQ feedback transmission for the low latency data transmission with bits of the MBB transmission (e.g., though multiplexing low latency transmissions and MBB transmissions may be challenging and may result in a high payload and reduced reliability of the low latency transmission). Alternatively, UE 115-*c* may drop the MBB transmission. In some cases, base station 105-*c* may transmit an indication (e.g., via RRC signaling) of whether UE 115-*c* is to multiplex the transmissions or drop the MBB transmission (e.g., whether to multiplex the transmissions or drop the MBB transmission may be configurable).

If UE 115-*c* determines that the PUCCH resource allocated for a HARQ feedback transmission on a low latency channel overlaps with resources allocated for an MBB transmission on an MBB channel, and UE 115-*c* determines to drop the other transmission and transmit the HARQ feedback transmission, UE 115-*c* may drop the other transmission and transmit the HARQ feedback transmission using various techniques.

In one aspect, UE 115-*c* may avoid transmitting the MBB transmission on at least the portion of the MBB channel that overlaps with the low latency channel (e.g., avoid transmitting either the overlapping portion of the MBB transmission or the remainder of the MBB transmission), and UE 115-*c* may transmit the HARQ feedback transmission on the low latency channel. This technique may be used regardless of an MBB PUCCH format used for transmitting the MBB transmission. However, for PUCCH format one, a time domain orthogonal cover code (TD-OCC) may be used across the symbols, so other users sharing the same resource (e.g., the same PUCCH resource) may experience interference if the MBB transmission is dropped. In another aspect, UE 115-*c* may puncture the MBB transmission on the MBB channel with bits of the HARQ feedback transmission. This technique may be used if a PUCCH resource being punctured on the MBB channel has a PUCCH format of two, three, or four. In this aspect, base station 105-*c* may identify which symbols of the MBB transmission are punctured, and base station 105-*c* may set the log-likelihood ratios of these symbols to zero and may attempt to decode the MBB transmission. The table below illustrates examples of PUCCH formats.

TABLE 1

PUCCH formats

| PUCCH Format | Length in Number of OFDM symbols | Number of Uplink Control Information (UCI) Bits | Waveform | Description |
| --- | --- | --- | --- | --- |
| 0 | 1-2 | ≤2 | Computer generated sequence | Short PUCCH format with 1-2 bits UCI |
| 1 | 4-14 | ≤2 | Computer generated sequence | Long PUCCH format with 1-2 bits UCI (TD-OCC) |
| 2 | 1-2 | >2 | OFDM | Short PUCCH format with >2 bits UCI |
| 3 | 4-14 | >2 | DFT-S-OFDM | Long PUCCH format with >2 bits UCI and no multiplexing capability |
| 4 | 4-14 | >2 | DFT-S-OFDM | Long PUCCH format with >2 bits UCI and multiplexing capability |

Figure 6:
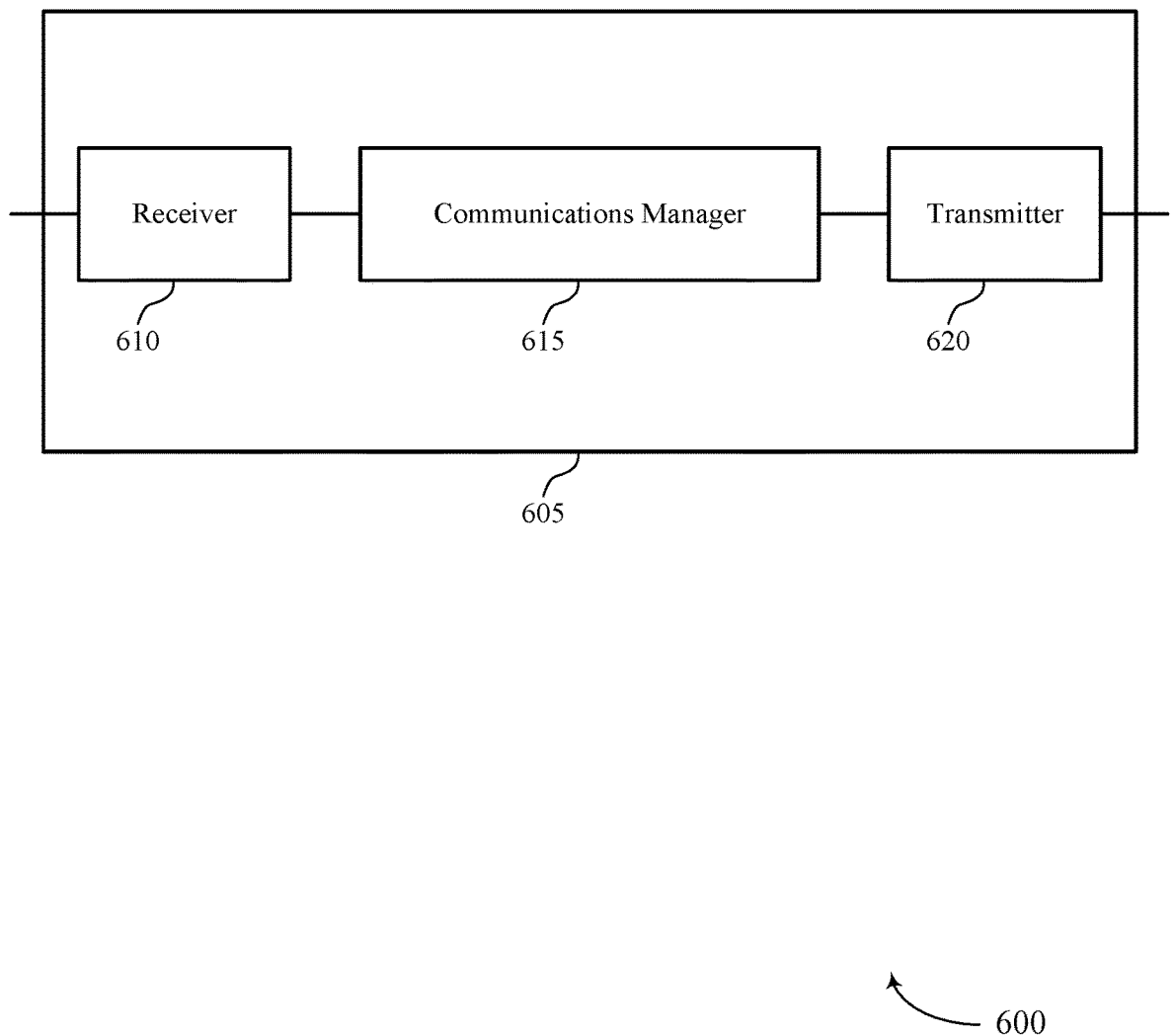
FIGS. 6 and 7 show block diagrams of devices that support HARQ feedback for low latency transmissions in accordance with aspects of the present disclosure.

FIG. 6 shows a block diagram 600 of a device 605 that supports HARQ feedback for low latency transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to HARQ feedback for low latency transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a configuration of ACK/NACK resource sets across a set of sub-slots in a slot, receive a first data transmission in a first data channel from a base station and a second data transmission in a second data channel from the base station, receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmit the feedback for the first data transmission on the first resource set and the feedback for the second data transmission on the second resource set.

The communications manager 615 may also receive a first data transmission in a data channel from a base station, identify ACK/NACK feedback to provide for the first data transmission in a first feedback transmission, drop the other transmission or multiplexing the first feedback transmission with the other transmission based on the determining, and determine that a first set of resources allocated for the first feedback transmission overlaps in a time domain with a second set of resources allocated for another transmission. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable mitigation of collisions or other interference between HARQ feedback transmissions in a network. At least one implementation may enable the communications manager 615 to effectively identify resources allocated for HARQ feedback which may be separate from other resources used for HARQ feedback from other devices. At least one implementation may enable communications manager 615 to increase the throughput to device 605 by multiplexing multiple HARQ and other transmissions which may be scheduled on overlapping resources.

Based on implementing the collision avoidance techniques as described herein, one or more processors of the device 605 (e.g., processor(s) controlling or incorporated with one or more of receiver 610, communications manager 615, and transmitter 620) may reduce an amount of time required to effectively determine resources for transmitting HARQ feedback.

Figure 7:
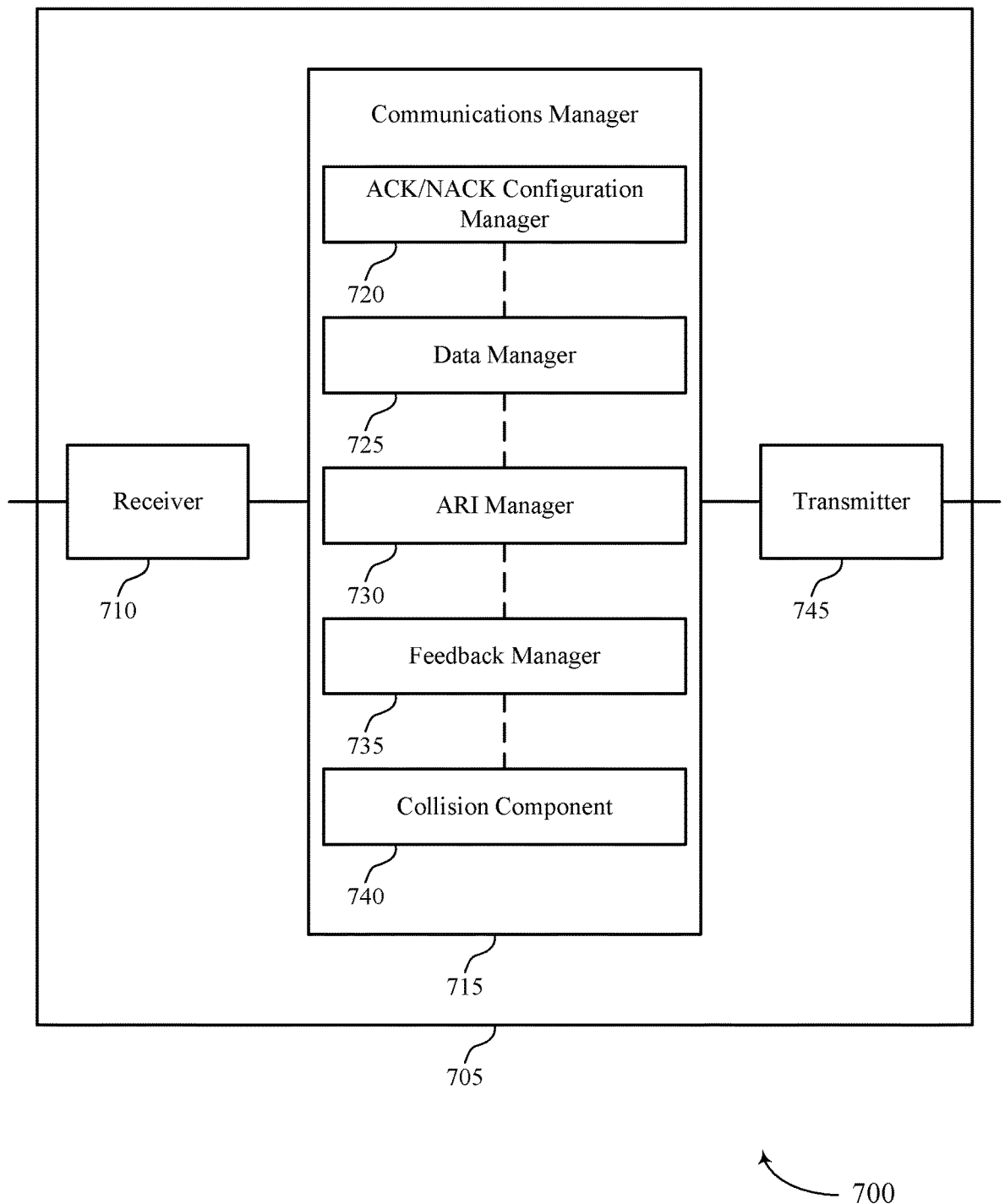

FIG. 7 shows a block diagram 700 of a device 705 that supports HARQ feedback for low latency transmissions in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to HARQ feedback for low latency transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an ACK/NACK configuration manager 720, a data manager 725, an ARI manager 730, a feedback manager 735, and a collision component 740. The communications manager 715 may be an example of aspects of the communications manager 910 described herein.

The ACK/NACK configuration manager 720 may identify a configuration of ACK/NACK resource sets across a set of sub-slots in a slot. The data manager 725 may receive a first data transmission in a first data channel from a base station and a second data transmission in a second data channel from the base station. The ARI manager 730 may receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets. The feedback manager 735 may transmit the feedback for the first data transmission on the first resource set and the feedback for the second data transmission on the second resource set.

The data manager 725 may receive a first data transmission in a data channel from a base station. The feedback manager 735 may identify ACK/NACK feedback to provide for the first data transmission in a first feedback transmission and drop the other transmission or multiplexing the first feedback transmission with the other transmission based on the determining. The collision component 740 may determine that a first set of resources allocated for the first feedback transmission overlaps in a time domain with a second set of resources allocated for another transmission.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
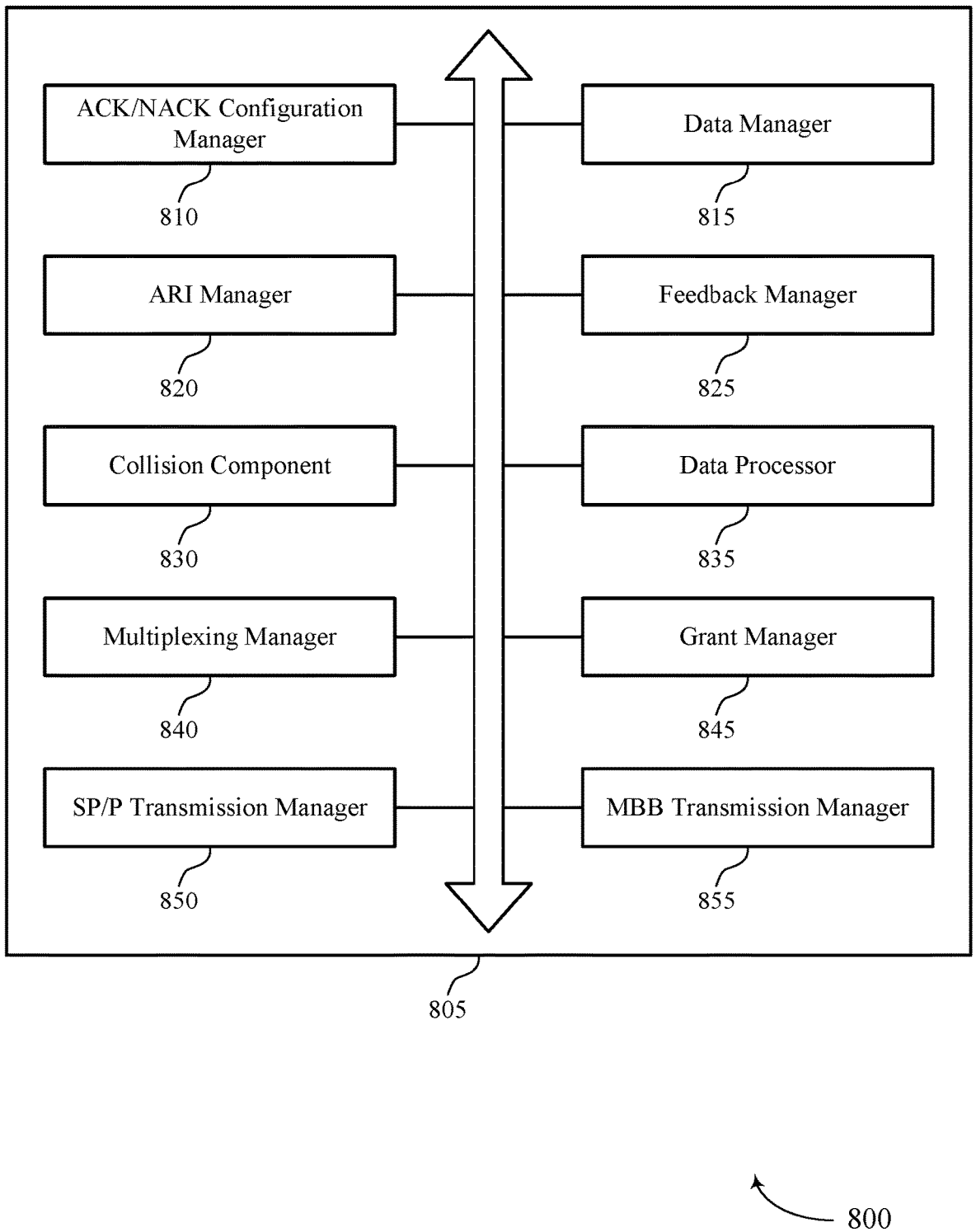
FIG. 8 shows a block diagram of a communications manager that supports HARQ feedback for low latency transmissions in accordance with aspects of the present disclosure.

FIG. 8 shows a block diagram 800 of a communications manager 805 that supports HARQ feedback for low latency transmissions in accordance with aspects of the present disclosure. The communications manager 805 may be an example of aspects of a communications manager 615, a communications manager 715, or a communications manager 910 described herein. The communications manager 805 may include an ACK/NACK configuration manager 810, a data manager 815, an ARI manager 820, a feedback manager 825, a collision component 830, a data processor 835, a multiplexing manager 840, a grant manager 845, a semi-persistent or periodic (SP/P) transmission manager 850, and a MBB transmission manager 855. Each of these modules may communicate, directly or indirectly, with one another (e.g., via one or more buses).

The ACK/NACK configuration manager 810 may identify a configuration of ACK/NACK resource sets across a set of sub-slots in a slot. In some examples, the ACK/NACK configuration manager 810 may identify that each ACK/NACK resource set is completely within respective sub-slots of the slot such that the first resource set and the second resource set are each exclusive of each other in the time domain based on the configuration of the ACK/NACK resource sets, and where resource sets are configured for providing feedback such that none of the resource sets overlap and collisions between feedback transmissions are avoided. In some examples, the ACK/NACK configuration manager 810 may receive, from the base station, the configuration of the set of ACK/NACK resource sets via RRC signaling.

The data manager 815 may receive a first data transmission in a first data channel from a base station and a second data transmission in a second data channel from the base station. In some examples, the data manager 815 may receive a first data transmission in a data channel from a base station. The ARI manager 820 may receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets.

In some examples, the ARI manager 820 may receive one or more feedback timing parameters with the first data transmission and the second data transmission, the one or more feedback timing parameters indicating the first resource set and the second resource set such that the first resource set and the second resource set are each exclusive of each other in the time domain even if the configuration of ACK/NACK resource sets includes overlapping resource sets. In some examples, the ARI manager 820 may receive one or more ARIs.

The feedback manager 825 may transmit the feedback for the first data transmission on the first resource set and the feedback for the second data transmission on the second resource set. In some examples, the feedback manager 825 may identify ACK/NACK feedback to provide for the first data transmission in a first feedback transmission. In some examples, the feedback manager 825 may drop the other transmission or multiplexing the first feedback transmission with the other transmission based on the determining. In some examples, the feedback manager 825 may transmit the multiplexed ACK/NACK feedback bits on a third set of resources in a multiplexed feedback transmission.

In some examples, the feedback manager 825 may transmit the multiplexed bits on a third set of resources in a multiplexed transmission. In some examples, the feedback manager 825 may transmit the first feedback transmission. In some examples, the feedback manager 825 may transmit the first feedback transmission on a low latency channel. In some examples, the feedback manager 825 may transmit the first feedback transmission on the low latency channel. In some examples, the feedback manager 825 may puncture a portion of the MBB transmission on the MBB channel that overlaps with the first feedback transmission with bits of the first feedback transmission. In some examples, the feedback manager 825 may receive an indication via RRC signaling of whether to drop the other transmission or multiplex the first feedback transmission with the other transmission.

In some cases, each of the first set of resources, second set of resources, and third set of resources includes uplink control channel resources. In some cases, an uplink control channel resource corresponds to a control channel format and time and frequency resources. In some cases, the MBB channel includes an uplink control channel with control channel format two, three, or four. The collision component 830 may determine that a first set of resources allocated for the first feedback transmission overlaps in a time domain with a second set of resources allocated for another transmission.

The data processor 835 may determine that sufficient time has passed for processing the first data transmission and the second data transmission. The multiplexing manager 840 may multiplex ACK/NACK feedback bits of the first feedback transmission with ACK/NACK feedback bits of the second feedback transmission. In some examples, the multiplexing manager 840 may multiplex ACK/NACK feedback bits of the first feedback transmission with bits of the semi-persistent or periodic transmission. In some examples, the multiplexing manager 840 may multiplex ACK/NACK feedback bits of the first feedback transmission with bits of the MBB transmission.

In some examples, the multiplexing manager 840 may multiplex bits of the first feedback transmission with bits of the other transmission. The grant manager 845 may receive a grant for the first data transmission, the grant including an indication of the first set of resources for the first feedback transmission or the third set of resources for the multiplexed feedback transmission. In some examples, the grant manager 845 may interpret the indication in the grant as allocating the third set of resources for the multiplexed feedback transmission based on determining that the first set of resources overlaps in a time domain with the second set of resources.

In some examples, the grant manager 845 may receive a grant for the first data transmission, the grant including an indication of the first set of resources for the first feedback transmission or the third set of resources for the multiplexed transmission. In some examples, the grant manager 845 may interpret the indication in the grant as allocating the third set of resources for the multiplexed transmission based on determining that the first set of resources overlaps in a time domain with the second set of resources. In some cases, the interpreting the indication in the grant as allocating the third set of resources for the multiplexed feedback transmission is further based on a first number of ACK/NACK feedback bits in the first feedback transmission and a second number of ACK/NACK feedback bits in the second feedback transmission.

In some cases, the indication in the grant of ACK/NACK feedback resources includes an ARI. In some cases, the first data transmission is scheduled after the second data transmission. The SP/P transmission manager 850 may drop the semi-persistent or periodic transmission. In some examples, the SP/P transmission manager 850 may suspend the semi-persistent or periodic transmission. The MBB transmission manager 855 may drop the MBB transmission on an MBB channel. In some examples, the MBB transmission manager 855 may refrain from transmitting at least a portion of the MBB transmission on the MBB channel that overlaps with the first feedback transmission. In some cases, the MBB channel includes an uplink control channel with any control channel format.

Figure 9:
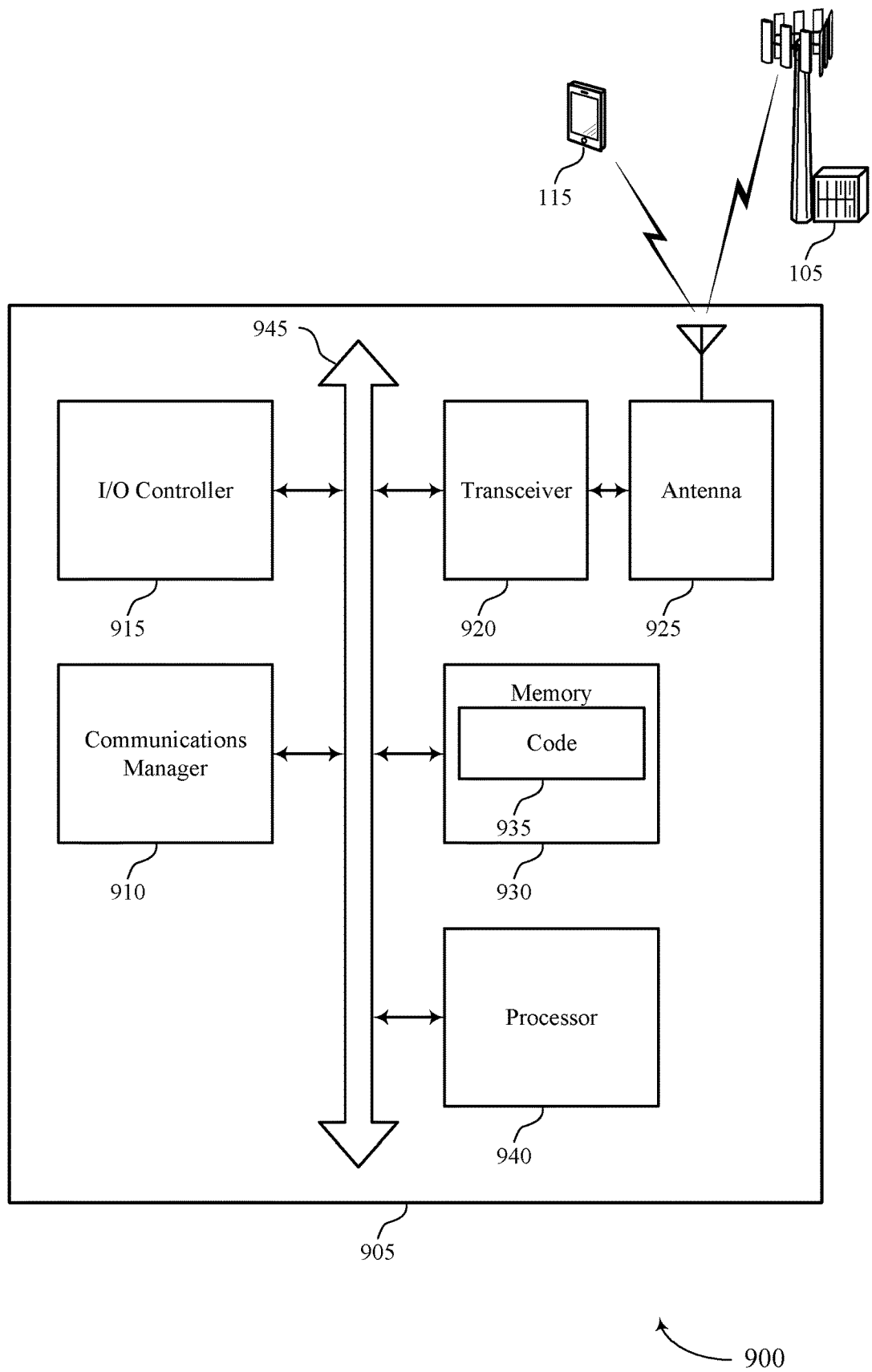
FIG. 9 shows a diagram of a system including a device that supports HARQ feedback for low latency transmissions in accordance with aspects of the present disclosure.

FIG. 9 shows a diagram of a system 900 including a device 905 that supports HARQ feedback for low latency transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a configuration of ACK/NACK resource sets across a set of sub-slots in a slot, receive a first data transmission in a first data channel from a base station and a second data transmission in a second data channel from the base station, receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets, and transmit the feedback for the first data transmission on the first resource set and the feedback for the second data transmission on the second resource set.

The communications manager 910 may also receive a first data transmission in a data channel from a base station, identify ACK/NACK feedback to provide for the first data transmission in a first feedback transmission, drop the other transmission or multiplexing the first feedback transmission with the other transmission based on the determining, and determine that a first set of resources allocated for the first feedback transmission overlaps in a time domain with a second set of resources allocated for another transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting HARQ feedback for low latency transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
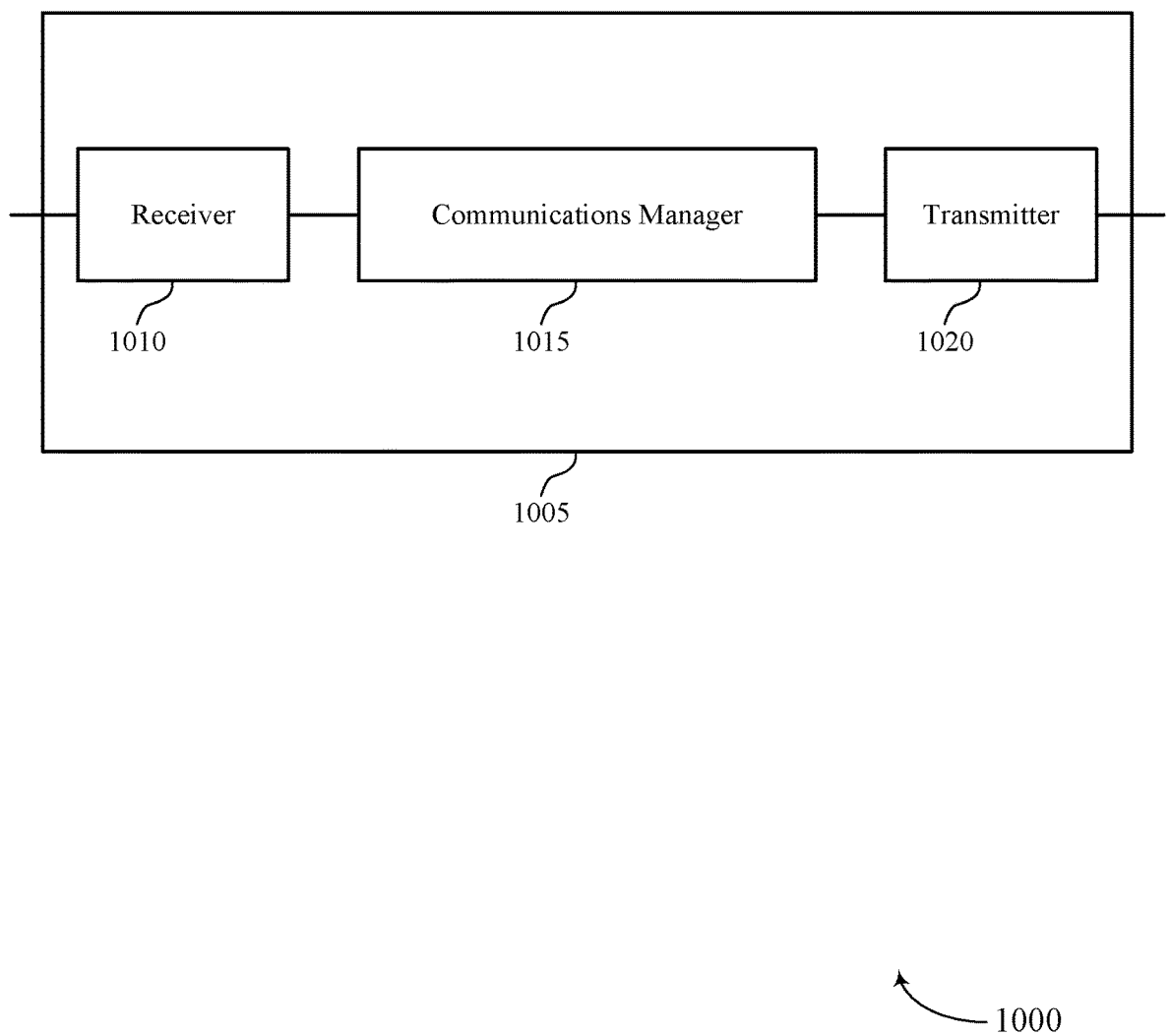
FIGS. 10 and 11 show block diagrams of devices that support HARQ feedback for low latency transmissions in accordance with aspects of the present disclosure.

FIG. 10 shows a block diagram 1000 of a device 1005 that supports HARQ feedback for low latency transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to HARQ feedback for low latency transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration of ACK/NACK resource sets across a set of sub-slots in a slot, transmit a first data transmission in a first data channel to the UE and a second data transmission in a second data channel to the UE, transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receive the feedback for the first data transmission on the first resource set and the feedback for the second data transmission on the second resource set.

The communications manager 1015 may also identify a first data transmission to be transmitted to a UE, transmit a grant to schedule the first data transmission, the grant including an indication of a first set of resources allocated for a first feedback transmission for the data transmission and a second set of resources allocated for multiplexing the first feedback transmission with another transmission, and receive the first feedback transmission for the data transmission on the first set of resources or the first feedback transmission multiplexed with the other transmission on the second set of resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
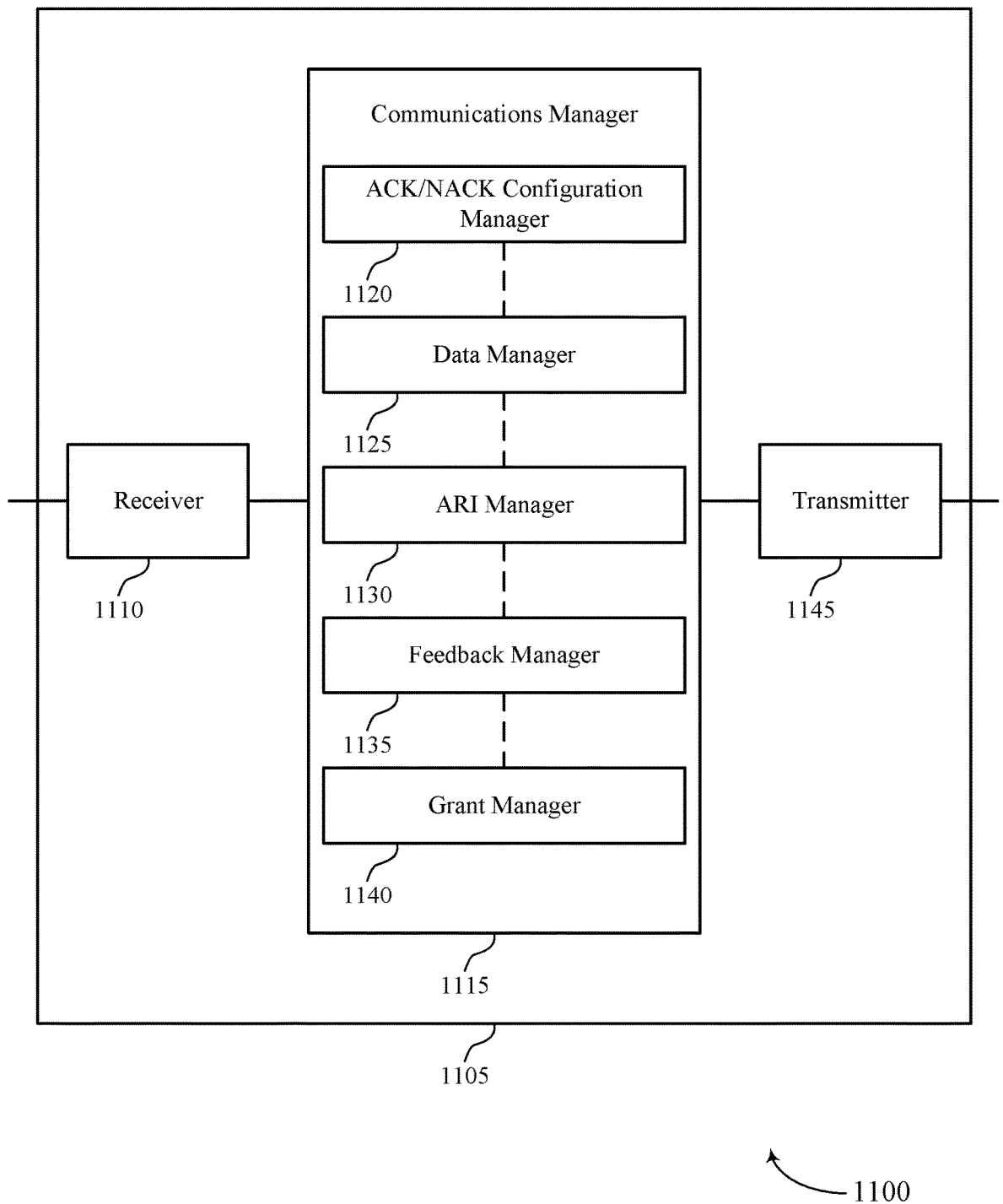

FIG. 11 shows a block diagram 1100 of a device 1105 that supports HARQ feedback for low latency transmissions in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to HARQ feedback for low latency transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an ACK/NACK configuration manager 1120, a data manager 1125, an ARI manager 1130, a feedback manager 1135, and a grant manager 1140. The communications manager 1115 may be an example of aspects of the communications manager 1310 described herein.

The ACK/NACK configuration manager 1120 may transmit, to a UE, a configuration of ACK/NACK resource sets across a set of sub-slots in a slot. The data manager 1125 may transmit a first data transmission in a first data channel to the UE and a second data transmission in a second data channel to the UE. The ARI manager 1130 may transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets. The feedback manager 1135 may receive the feedback for the first data transmission on the first resource set and the feedback for the second data transmission on the second resource set.

The data manager 1125 may identify a first data transmission to be transmitted to a UE. The grant manager 1140 may transmit a grant to schedule the first data transmission, the grant including an indication of a first set of resources allocated for a first feedback transmission for the data transmission and a second set of resources allocated for multiplexing the first feedback transmission with another transmission. The feedback manager 1135 may receive the first feedback transmission for the data transmission on the first set of resources or the first feedback transmission multiplexed with the other transmission on the second set of resources.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
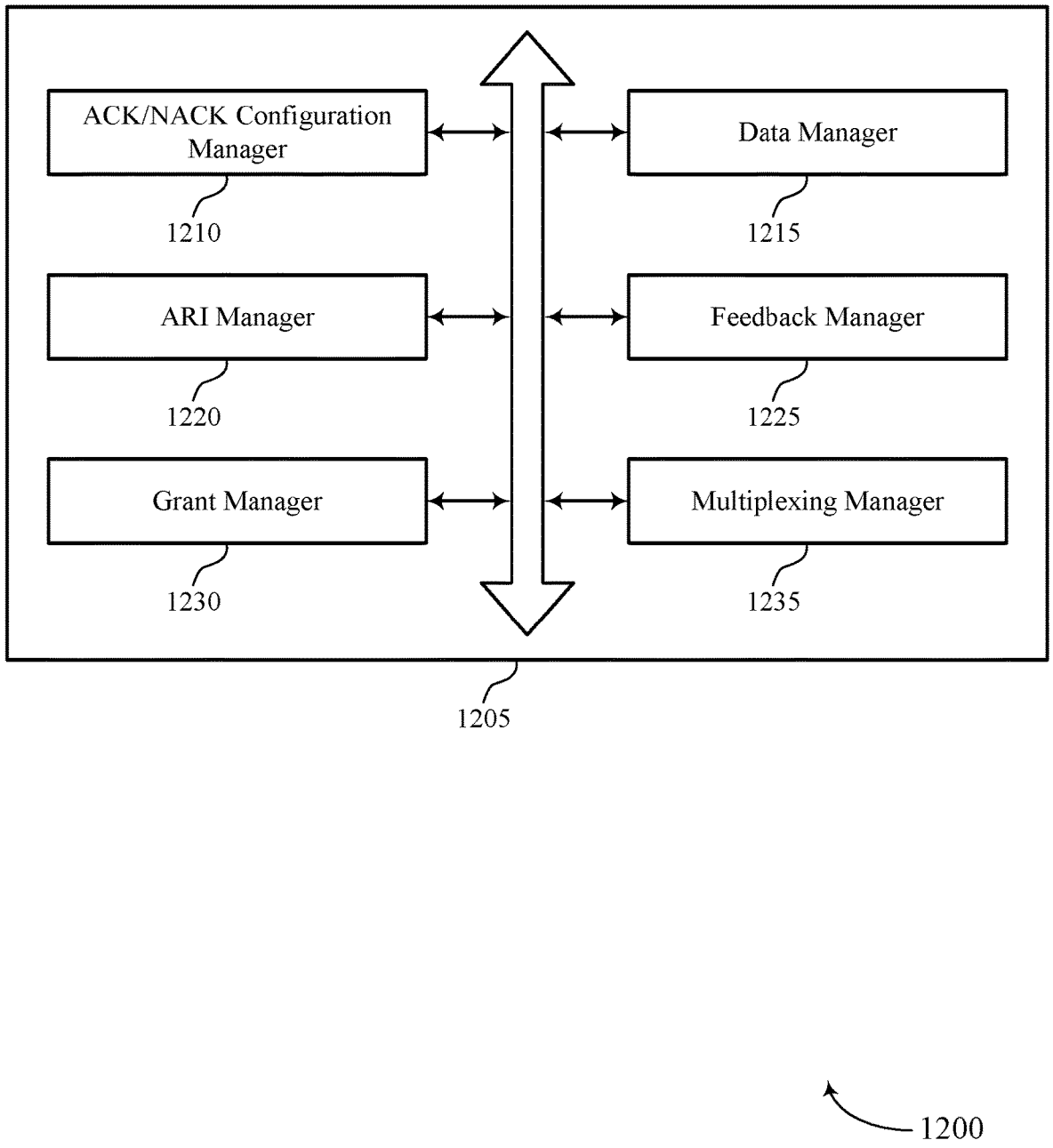
FIG. 12 shows a block diagram of a communications manager that supports HARQ feedback for low latency transmissions in accordance with aspects of the present disclosure.

FIG. 12 shows a block diagram 1200 of a communications manager 1205 that supports HARQ feedback for low latency transmissions in accordance with aspects of the present disclosure. The communications manager 1205 may be an example of aspects of a communications manager 1015, a communications manager 1115, or a communications manager 1310 described herein. The communications manager 1205 may include an ACK/NACK configuration manager 1210, a data manager 1215, an ARI manager 1220, a feedback manager 1225, a grant manager 1230, and a multiplexing manager 1235. Each of these modules may communicate, directly or indirectly, with one another (e.g., via one or more buses).

The ACK/NACK configuration manager 1210 may transmit, to a UE, a configuration of ACK/NACK resource sets across a set of sub-slots in a slot. In some examples, the ACK/NACK configuration manager 1210 may determine the configuration of the ACK/NACK resource sets such that none of the ACK/NACK resource sets overlap to avoid collisions between feedback transmissions. In some examples, the ACK/NACK configuration manager 1210 may transmit the configuration of ACK/NACK resource sets via RRC signaling. The data manager 1215 may transmit a first data transmission in a first data channel to the UE and a second data transmission in a second data channel to the UE. In some examples, the data manager 1215 may identify a first data transmission to be transmitted to a UE.

The ARI manager 1220 may transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets.

In some examples, the ARI manager 1220 may determine the first and second resource sets for the UE to use for providing feedback for the first and second data transmissions such that the first and second resource sets are exclusive of each other in the time domain to avoid collisions between feedback transmissions. In some examples, the ARI manager 1220 may transmit one or more ARIs. In some cases, the indication in the grant of ACK/NACK feedback resources includes an ARI. The feedback manager 1225 may receive the feedback for the first data transmission on the first resource set and the feedback for the second data transmission on the second resource set. In some examples, the feedback manager 1225 may receive the first feedback transmission for the data transmission on the first set of resources or the first feedback transmission multiplexed with the other transmission on the second set of resources.

In some examples, the feedback manager 1225 may receive bits of the first feedback transmission multiplexed with bits of the second feedback transmission on the second set of resources, where the first set of resources allocated for the first feedback transmission overlaps in a time domain with resources allocated for the second feedback transmission. In some examples, the feedback manager 1225 may receive bits of the first feedback transmission multiplexed with bits of the semi-persistent or periodic transmission on the second set of resources, where the first set of resources allocated for the first feedback transmission overlaps in a time domain with resources allocated for the semi-persistent or periodic transmission. In some examples, the feedback manager 1225 may receive bits of the first feedback transmission multiplexed with bits of the MBB transmission on the second set of resources, where the first set of resources allocated for the first feedback transmission overlaps in a time domain with resources allocated for the MBB transmission.

The grant manager 1230 may transmit a grant to schedule the first data transmission, the grant including an indication of a first set of resources allocated for a first feedback transmission for the data transmission and a second set of resources allocated for multiplexing the first feedback transmission with another transmission. The multiplexing manager 1235 may transmit RRC signaling indicating that the UE is to multiplex the first feedback transmission with the other transmission if the first set of resources allocated for the first feedback transmission overlaps with resources allocated for the other transmission.

Figure 13:
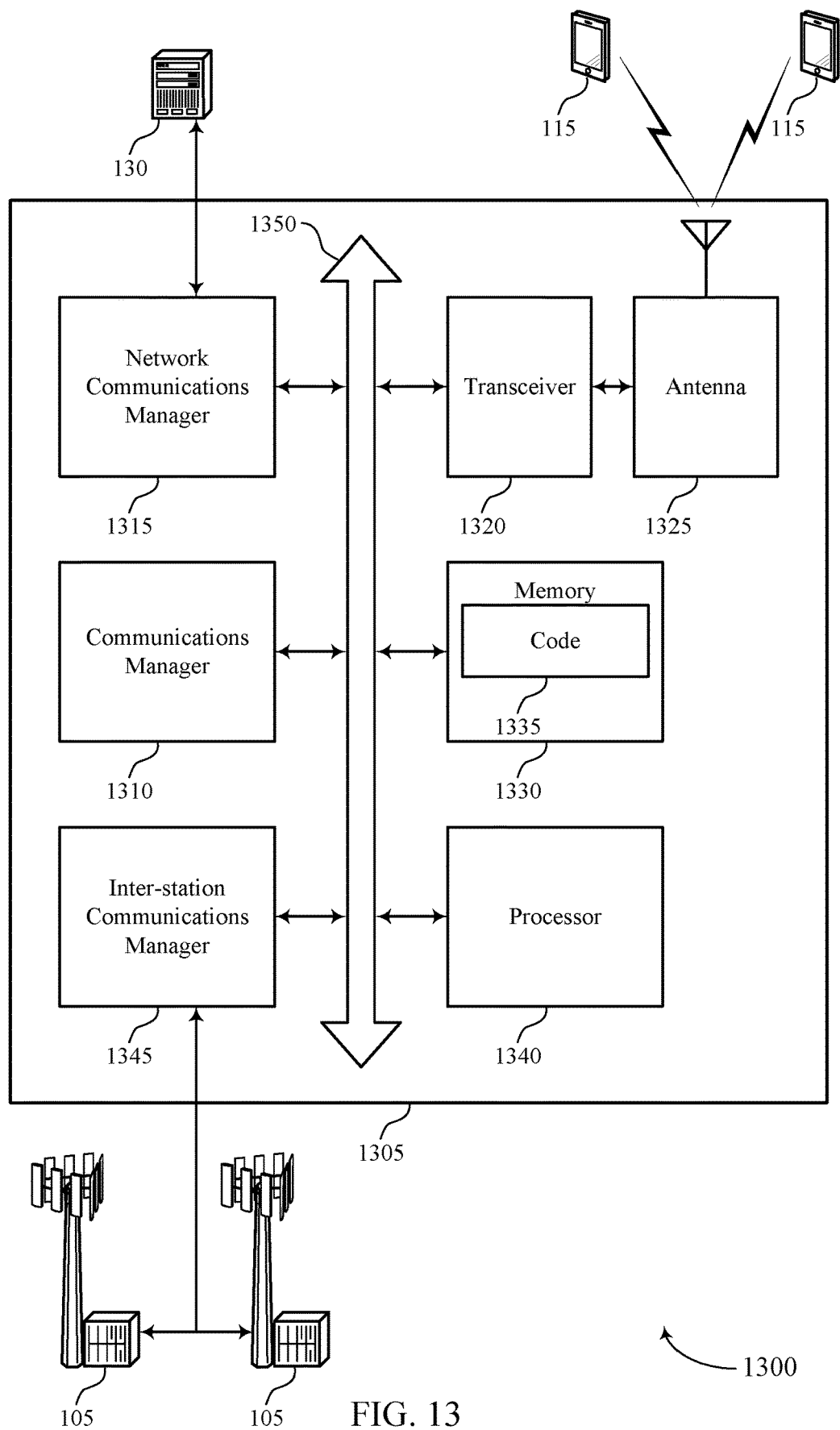
FIG. 13 shows a diagram of a system including a device that supports HARQ feedback for low latency transmissions in accordance with aspects of the present disclosure.

FIG. 13 shows a diagram of a system 1300 including a device 1305 that supports HARQ feedback for low latency transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration of ACK/NACK resource sets across a set of sub-slots in a slot, transmit a first data transmission in a first data channel to the UE and a second data transmission in a second data channel to the UE, transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets, and receive the feedback for the first data transmission on the first resource set and the feedback for the second data transmission on the second resource set.

The communications manager 1310 may also identify a first data transmission to be transmitted to a UE, transmit a grant to schedule the first data transmission, the grant including an indication of a first set of resources allocated for a first feedback transmission for the data transmission and a second set of resources allocated for multiplexing the first feedback transmission with another transmission, and receive the first feedback transmission for the data transmission on the first set of resources or the first feedback transmission multiplexed with the other transmission on the second set of resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting HARQ feedback for low latency transmissions).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
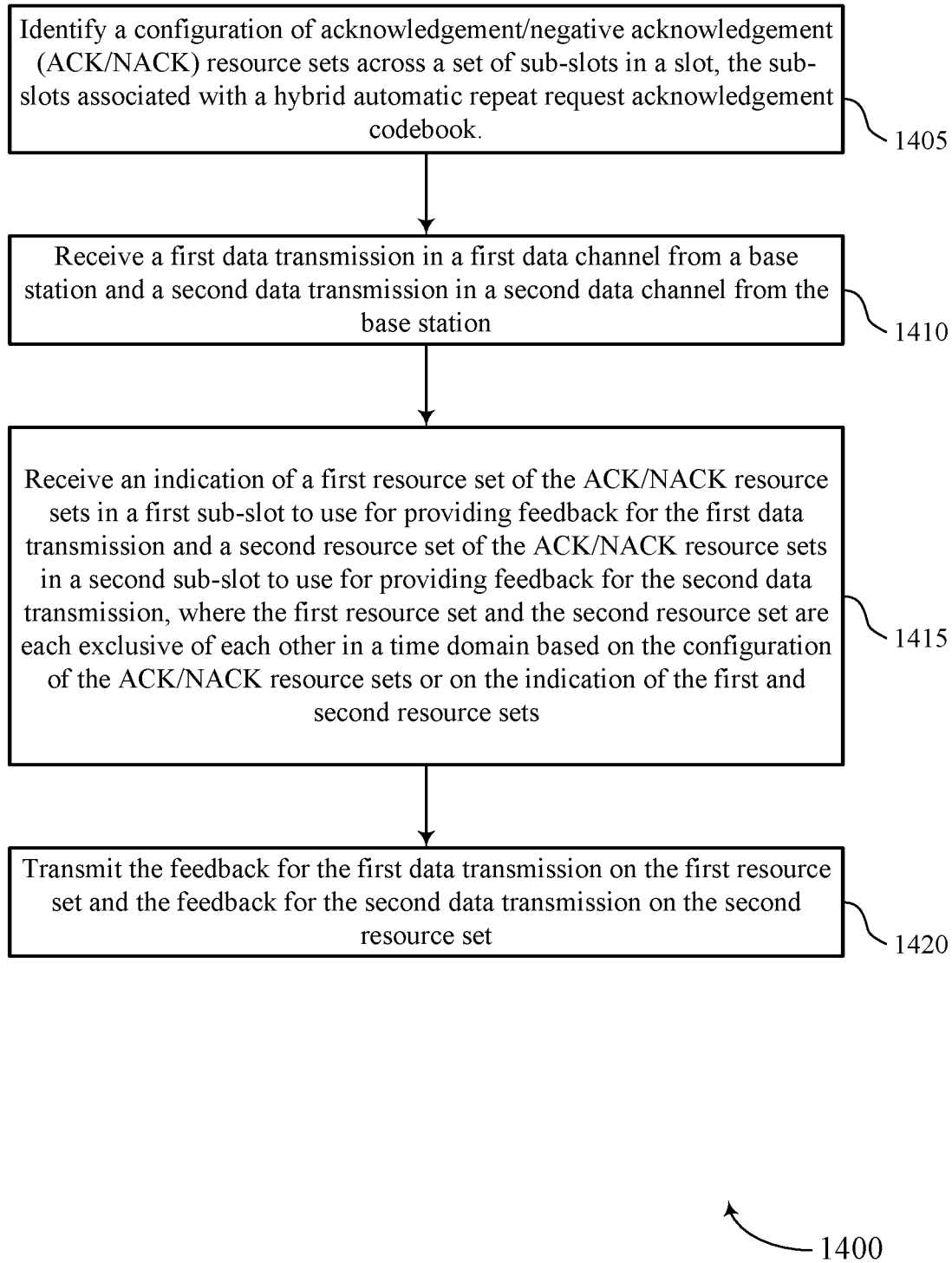
FIGS. 14 through 17 show flowcharts illustrating methods that support HARQ feedback for low latency transmissions in accordance with aspects of the present disclosure.

FIG. 14 shows a flowchart illustrating a method 1400 that supports HARQ feedback for low latency transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may identify a configuration of ACK/NACK resource sets across a set of sub-slots in a slot, the sub-slots associated with a hybrid automatic repeat request acknowledgement codebook. The operations of 1405 may be performed according to the methods described herein. In some examples, aspects of the operations of 1405 may be performed by an ACK/NACK configuration manager as described with reference to FIGS. 6 through 9.

At 1410, the UE may receive a first data transmission in a first data channel from a base station and a second data transmission in a second data channel from the base station. The operations of 1410 may be performed according to the methods described herein. In some examples, aspects of the operations of 1410 may be performed by a data manager as described with reference to FIGS. 6 through 9.

At 1415, the UE may receive an indication of a first resource set of the ACK/NACK resource sets in a first sub-slot to use for providing feedback for the first data transmission and a second resource set of the ACK/NACK resource sets in a second sub-slot to use for providing feedback for the second data transmission, where the first resource set and the second resource set are each exclusive of each other in a time domain based on the configuration of the ACK/NACK resource sets or on the indication of the first and second resource sets. The operations of 1415 may be performed according to the methods described herein. In some examples, aspects of the operations of 1415 may be performed by an ARI manager as described with reference to FIGS. 6 through 9.

At 1420, the UE may transmit the feedback for the first data transmission on the first resource set and the feedback for the second data transmission on the second resource set. The operations of 1420 may be performed according to the methods described herein. In some examples, aspects of the operations of 1420 may be performed by a feedback manager as described with reference to FIGS. 6 through 9.

Figure 15:
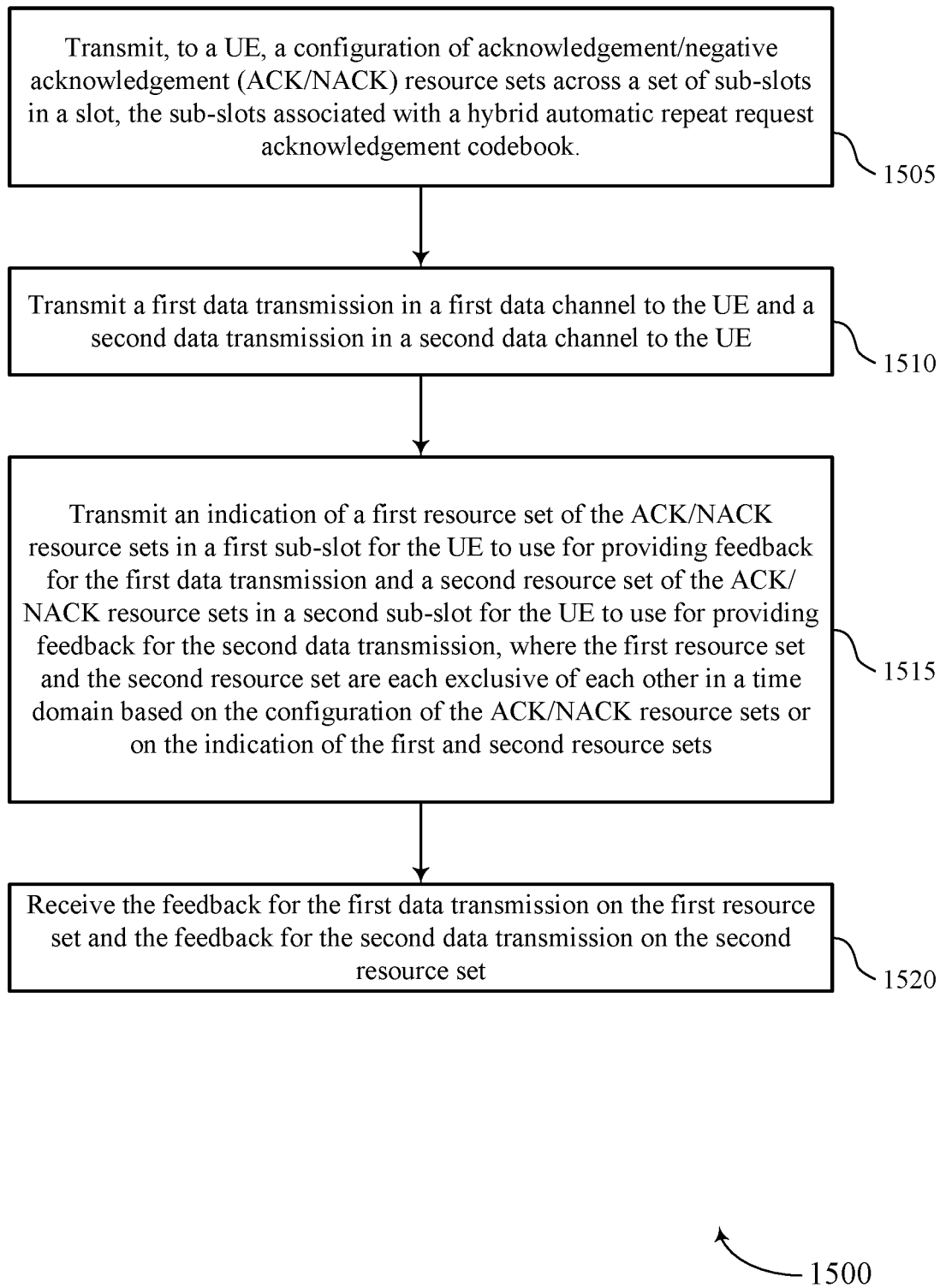

FIG. 15 shows a flowchart illustrating a method 1500 that supports HARQ feedback for low latency transmissions in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1505, the base station may transmit, to a UE, a configuration of ACK/NACK resource sets across a set of sub-slots in a slot, the sub-slots associated with a hybrid automatic repeat request acknowledgement codebook. The operations of 1505 may be performed according to the methods described herein. In some examples, aspects of the operations of 1505 may be performed by an ACK/NACK configuration manager as described with reference to FIGS. 10 through 13.

At 1510, the base station may transmit a first data transmission in a first data channel to the UE and a second data transmission in a second data channel to the UE. The operations of 1510 may be performed according to the methods described herein. In some examples, aspects of the operations of 1510 may be performed by a data manager as described with reference to FIGS. 10 through 13.

At 1515, the base station may transmit an indication of a first resource set of the ACK/NACK resource sets in a first sub-slot for the UE to use for providing feedback for the first data transmission and a second resource set of the ACK/NACK resource sets in a second sub-slot for the UE to use for providing feedback for the second data transmission, where the first resource set and the second resource set are each exclusive of each other in a time domain based on the configuration of the ACK/NACK resource sets or on the indication of the first and second resource sets. The operations of 1515 may be performed according to the methods described herein. In some examples, aspects of the operations of 1515 may be performed by an ARI manager as described with reference to FIGS. 10 through 13.

At 1520, the base station may receive the feedback for the first data transmission on the first resource set and the feedback for the second data transmission on the second resource set. The operations of 1520 may be performed according to the methods described herein. In some examples, aspects of the operations of 1520 may be performed by a feedback manager as described with reference to FIGS. 10 through 13.

Figure 16:
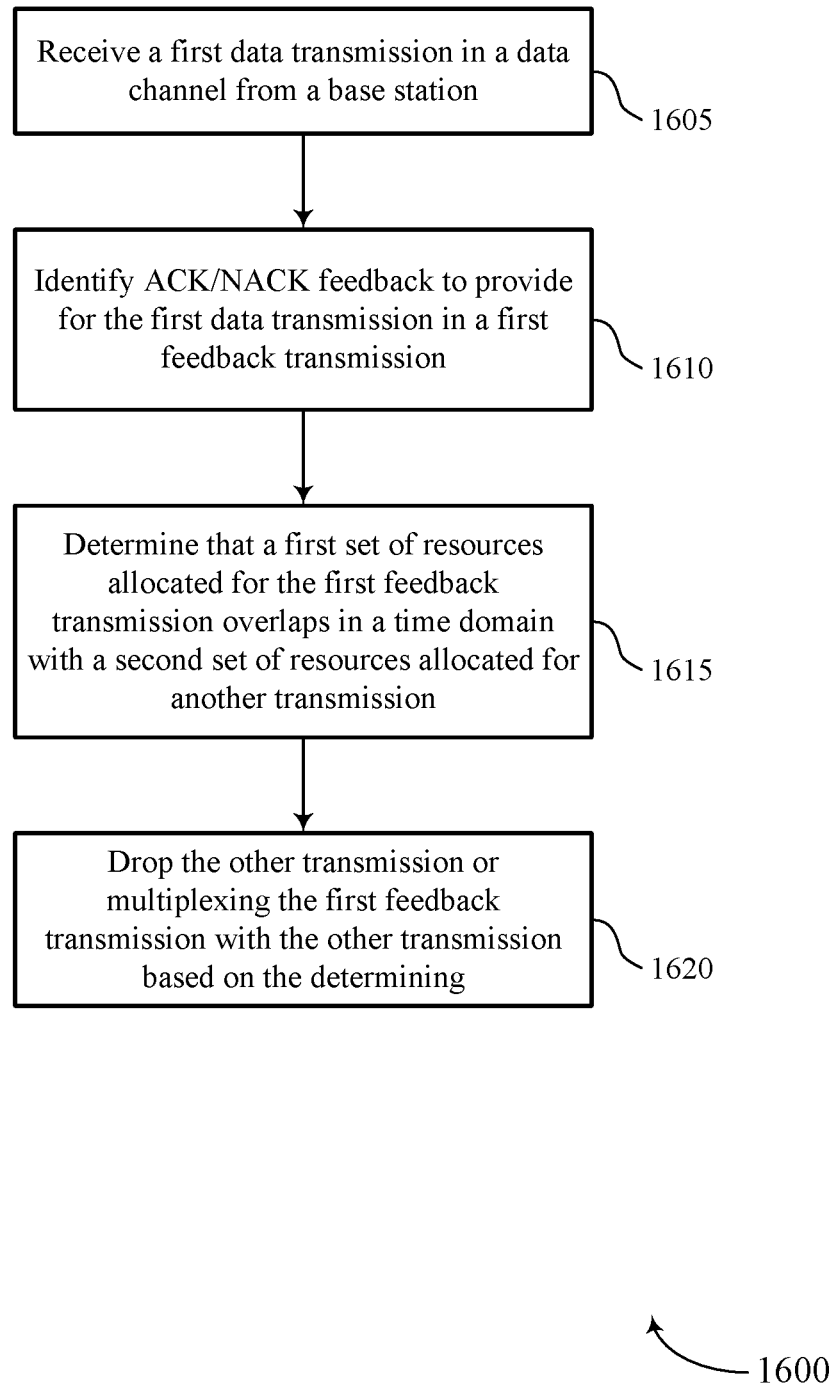

FIG. 16 shows a flowchart illustrating a method 1600 that supports HARQ feedback for low latency transmissions in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1605, the UE may receive a first data transmission in a data channel from a base station. The operations of 1605 may be performed according to the methods described herein. In some examples, aspects of the operations of 1605 may be performed by a data manager as described with reference to FIGS. 6 through 9.

At 1610, the UE may identify ACK/NACK feedback to provide for the first data transmission in a first feedback transmission. The operations of 1610 may be performed according to the methods described herein. In some examples, aspects of the operations of 1610 may be performed by a feedback manager as described with reference to FIGS. 6 through 9.

At 1615, the UE may determine that a first set of resources allocated for the first feedback transmission overlaps in a time domain with a second set of resources allocated for another transmission. The operations of 1615 may be performed according to the methods described herein. In some examples, aspects of the operations of 1615 may be performed by a collision component as described with reference to FIGS. 6 through 9.

At 1620, the UE may drop the other transmission or multiplexing the first feedback transmission with the other transmission based on the determining. The operations of 1620 may be performed according to the methods described herein. In some examples, aspects of the operations of 1620 may be performed by a feedback manager as described with reference to FIGS. 6 through 9.

Figure 17:
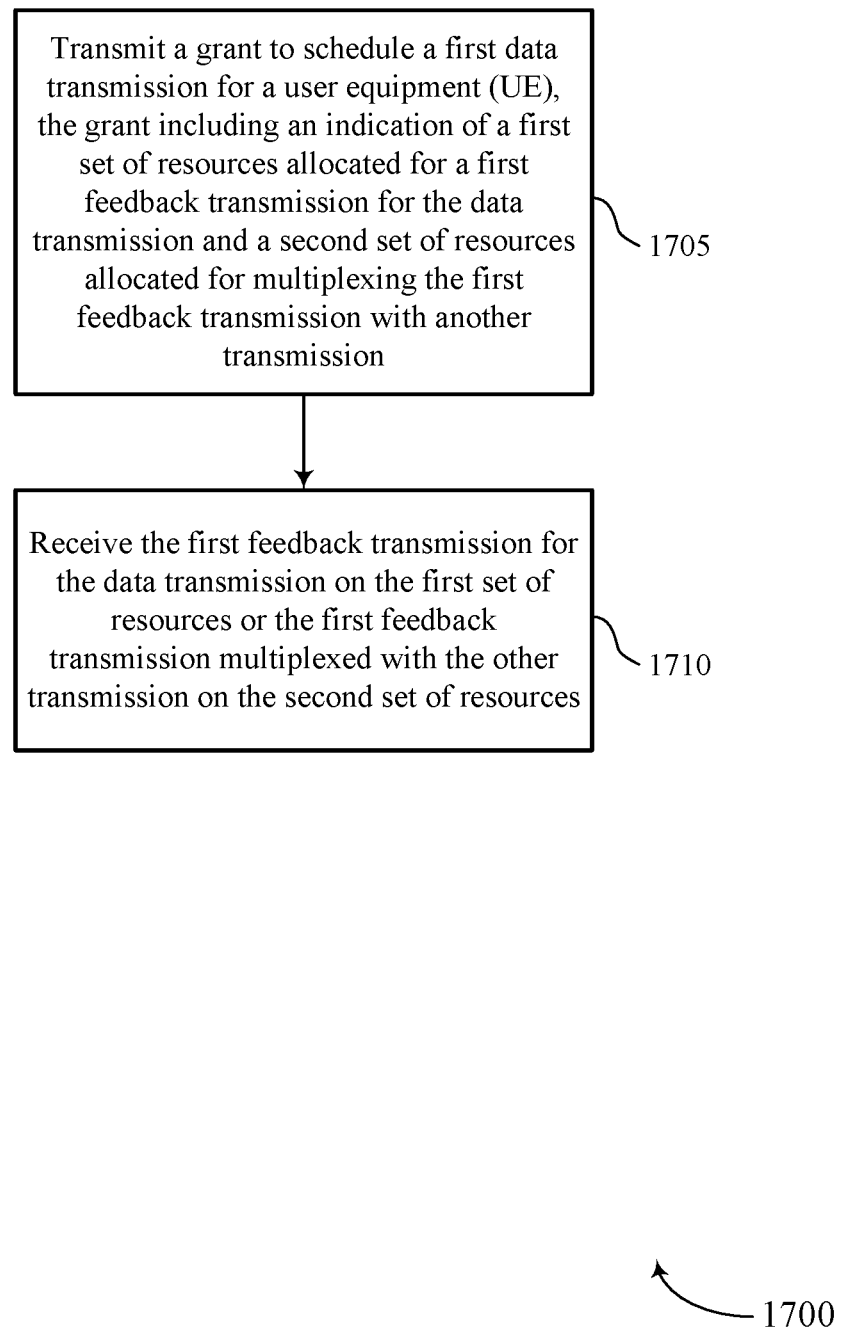

FIG. 17 shows a flowchart illustrating a method 1700 that supports HARQ feedback for low latency transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1705, the base station may transmit a grant to schedule a first data transmission for a user equipment (UE), the grant including an indication of a first set of resources allocated for a first feedback transmission for the data transmission and a second set of resources allocated for multiplexing the first feedback transmission with another transmission. The operations of 1710 may be performed according to the methods described herein. In some examples, aspects of the operations of 1710 may be performed by a grant manager as described with reference to FIGS. 10 through 13.

At 1710, the base station may receive the first feedback transmission for the data transmission on the first set of resources or the first feedback transmission multiplexed with the other transmission on the second set of resources. The operations of 1715 may be performed according to the methods described herein. In some examples, aspects of the operations of 1715 may be performed by a feedback manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations described herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a feedback resource configuration indicating multiple feedback resource sets for a plurality of sub-slots within a slot, the multiple feedback resource sets for reporting of feedback by the UE within the slot, wherein each feedback resource set of the multiple feedback resource sets is completely within a respective sub-slot of the slot based at least in part on the feedback resource configuration, wherein the multiple feedback resource sets are configured in accordance with a requirement to ensure that none of the multiple feedback resource sets overlap, and wherein an overlap of two or more feedback resource sets within the multiple feedback resource sets is associated with an error condition;

receiving an indication of a first feedback timing parameter indicating a first sub-slot that includes a first feedback resource set of the multiple feedback resource sets via which the UE is to provide feedback for a first data transmission, wherein the first feedback timing parameter indicates that the first sub-slot occurs a first quantity of sub-slots after a last sub-slot of the first data transmission, the last sub-slot of the first data transmission being a sub-slot that includes a last symbol of the first data transmission;

receiving an indication of a second feedback timing parameter indicating a second sub-slot that includes a second feedback resource set of the multiple feedback resource sets via which the UE is to provide feedback for a second data transmission, wherein the second feedback timing parameter indicates that the second sub-slot occurs a second quantity of sub-slots after a last sub-slot of the second data transmission, the last sub-slot of the second data transmission being a sub-slot that includes a last symbol of the second data transmission;

receiving the first data transmission via a first data channel and the second data transmission via a second data channel;

transmitting, using the first feedback resource set within the first sub-slot of the slot, the feedback for the first data transmission, the feedback for the first data transmission transmitted the first quantity of sub-slots after the last sub-slot of the first data transmission in accordance with the first feedback timing parameter; and transmitting, using the second feedback resource set within the second sub-slot of the slot, the feedback for the second data transmission, the feedback for the second data transmission transmitted the second quantity of sub-slots after the last sub-slot of the second data transmission in accordance with the second feedback timing parameter.

2. The method of claim 1, wherein the multiple feedback resource sets comprise hybrid automatic repeat request acknowledgment (HARQ-ACK) resource sets for a physical uplink control channel (PUCCH).

3. The method of claim 1, wherein:
the first feedback resource set and the second feedback resource set are exclusive of each other in a time domain.

4. The method of claim 1, wherein receiving the feedback resource configuration comprises:
receiving the feedback resource configuration via radio resource control (RRC) signaling.

5. The method of claim 1, wherein receiving the indications of the first feedback resource set, the first feedback timing parameter, the second feedback resource set, and the second feedback timing parameter comprises:
receiving one or more feedback resource indicators that indicate the first feedback resource set, the first feedback timing parameter, the second feedback resource set, and the second feedback timing parameter.

6. A method for wireless communication at a network entity, comprising:
transmitting a feedback resource configuration indicating multiple feedback resource sets for a plurality of sub-slots within a slot, the multiple feedback resource sets for reporting of feedback by a user equipment (UE) within the slot, wherein each feedback resource set of the multiple feedback resource sets is completely within a respective sub-slot of the slot based at least in part on the feedback resource configuration, wherein the multiple feedback resource sets are configured in accordance with a requirement to ensure that none of the multiple feedback resource sets overlap, and wherein an overlap of two or more feedback resource sets within the multiple feedback resource sets is associated with an error condition;

transmitting an indication of a first feedback timing parameter indicating a first sub-slot that includes a first feedback resource set of the multiple feedback resource sets via which the UE is to provide feedback for a first data transmission, wherein the first feedback timing parameter indicates that the first sub-slot occurs a first quantity of sub-slots after a last sub-slot of the first data transmission, the last sub-slot of the first data transmission being a sub-slot that includes a last symbol of the first data transmission;

transmitting an indication of a second feedback timing parameter indicating a second sub-slot that includes a second feedback resource set of the multiple feedback resource sets via which the UE is to provide feedback for a second data transmission, wherein the second feedback timing parameter indicates that the second sub-slot occurs a second quantity of sub-slots after a last sub-slot of the second data transmission, the last sub-slot of the second data transmission being a sub-slot that includes a last symbol of the second data transmission;

transmitting the first data transmission via a first data channel and the second data transmission via a second data channel;

receiving, using the first feedback resource set within the first sub-slot of the slot, the feedback for the first data transmission, the feedback for the first data transmission received the first quantity of sub-slots after the last sub-slot of the first data transmission in accordance with the first feedback timing parameter; and receiving, using the second feedback resource set within the second sub-slot of the slot, the feedback for the second data transmission, the feedback for the second data transmission received the second quantity of sub-slots after the last sub-slot of the second data transmission in accordance with the second feedback timing parameter.

7. The method of claim 6, wherein the multiple feedback resource sets comprise hybrid automatic repeat request acknowledgement (HARQ-ACK) resource sets for a physical uplink control channel (PUCCH).

8. The method of claim 6, further comprising:
determining the feedback resource configuration such that none of the multiple feedback resource sets overlap.

9. The method of claim 6, further comprising:
determining the first and second feedback resource sets for the UE to use for providing feedback for the first and second data transmissions such that the first and second feedback resource sets are exclusive of each other in a time domain.

10. The method of claim 6, wherein transmitting the feedback resource configuration comprises:
transmitting the feedback resource configuration via radio resource control (RRC) signaling.

11. The method of claim 6, wherein transmitting the indications of the first feedback resource set, the first feedback timing parameter, the second feedback resource set, and the second feedback timing indicator comprises:
transmitting one or more feedback resource indicators that indicate the first feedback resource set, the first feedback timing parameter, the second feedback resource set, and the second feedback timing parameter.

12. An apparatus for wireless communication at a user equipment (UE), comprising:
one or more processors;
one or more memories coupled with the one or more processors; and
instructions stored in the one or more memories and executable by the one or more processors to cause the apparatus to:
receive a feedback resource configuration indicating multiple feedback resource sets for a plurality of sub-slots within a slot, the multiple feedback resource sets for reporting of feedback by the UE within the slot, wherein each feedback resource set is completely within a respective sub-slot of the slot based at least in part on the feedback resource configuration, wherein the multiple feedback resource sets are configured in accordance with a requirement to ensure that none of the multiple feedback resource sets overlap, and wherein an overlap of two or more feedback resource sets within the multiple feedback resource sets is associated with an error condition;
receive an indication of a first feedback timing parameter indicating a first sub-slot that includes a first feedback resource set of the multiple feedback resource sets via which the UE is to provide feedback for a first data transmission, wherein the first feedback timing parameter indicates that the first sub-slot occurs a first quantity of sub-slots after a last sub-slot of the first data transmission, the last sub-slot of the first data transmission being a sub-slot that includes a last symbol of the first data transmission;
receive an indication of a second feedback timing parameter indicating a second sub-slot that includes a second feedback resource set of the multiple feedback resource sets via which the UE is to provide feedback for a second data transmission, wherein the second feedback timing parameter indicates that the second sub-slot occurs a second quantity of sub-slots after a last sub-slot of the second data transmission, the last sub-slot of the second data transmission being a sub-slot that includes a last symbol of the second data transmission;
receive the first data transmission via a first data channel and the second data transmission via a second data channel;
transmit, using the first feedback resource set within the first sub-slot of the slot, the feedback for the first data transmission, the feedback for the first data transmission transmitted the first quantity of sub-slots after the last sub-slot of the first data transmission in accordance with the first feedback timing parameter; and
transmit, using the second feedback resource set within the second sub-slot of the slot, the feedback for the second data transmission, the feedback for the second data transmission transmitted the second quantity of sub-slots after the last sub-slot of the second data transmission in accordance with the second feedback timing parameter.

13. The apparatus of claim 12, wherein the multiple feedback resource sets comprise hybrid automatic repeat request acknowledgment (HARQ-ACK) resource sets for a physical uplink control channel (PUCCH).

14. The apparatus of claim 12, wherein:
the first feedback resource set and the second feedback resource set are exclusive of each other in a time domain.

15. The apparatus of claim 12, wherein the instructions to receive the feedback resource configuration comprise instructions executable by the one or more processors to cause the apparatus to:
receive the feedback resource configuration via radio resource control (RRC) signaling.

16. The apparatus of claim 12, wherein the instructions to receive the indications of the first feedback resource set, the first feedback timing parameter,
the second feedback resource set, and the second feedback timing parameter comprise instructions executable by the one or more processors to cause the apparatus to:
receive one or more feedback resource indicators that indicate the first feedback resource set, the first feedback timing parameter, the second feedback resource set, and the second feedback timing parameter.

17. An apparatus for wireless communication at a network entity, comprising:
one or more processors;
one or more memories coupled with the one or more processors; and
instructions stored in the one or more memories and executable by the one or more processors to cause the apparatus to:
transmit a feedback resource configuration indicating multiple feedback resource sets for a plurality of sub-slots within a slot, the multiple feedback resource sets for reporting of feedback by a user equipment (UE) within the slot, wherein each feedback resource set of the multiple feedback resource sets is completely within a respective sub-slot of the slot based at least in part on the feedback resource configuration, wherein the multiple feedback resource sets are configured in accordance with a requirement to ensure that none of the multiple feedback resource sets overlap, and wherein an overlap of two or more feedback resource sets within the multiple feedback resource sets is associated with an error condition;
transmit an indication of a first feedback timing parameter indicating a first sub-slot that includes a first feedback resource set of the multiple feedback resource sets via which the UE is to provide feedback for a first data transmission, wherein the first feedback timing parameter indicates that the first sub-slot occurs a first quantity of sub-slots after a last sub-slot of the first data transmission, the last sub-slot of the first data transmission being a sub-slot that includes a last symbol of the first data transmission;
transmit an indication of a second feedback timing parameter indicating a second sub-slot that includes a second feedback resource set of the multiple feedback resource sets via which the UE is to provide feedback for a second data transmission, wherein the second feedback timing parameter indicates that the second sub-slot occurs a second quantity of sub-slots after a last sub-slot of the second data transmission, the last sub-slot of the second data transmission being a sub-slot that includes a last symbol of the second data transmission;
transmit the first data transmission via a first data channel and the second data transmission via a second data channel;

receive, using the first feedback resource set within the first sub-slot of the slot, the feedback for the first data transmission, the feedback for the first data transmission received the first quantity of sub-slots after the last sub-slot of the first data transmission in accordance with the first feedback timing parameter; and receive, using the second feedback resource set within the second sub-slot of the slot, the feedback for the second data transmission, the feedback for the second data transmission received the second quantity of sub-slots after the last sub-slot of the second data transmission in accordance with the second feedback timing parameter.

18. The apparatus of claim 17, wherein the multiple feedback resource sets comprise hybrid automatic repeat request acknowledgement (HARQ-ACK) resource sets for a physical uplink control channel (PUCCH).

19. The apparatus of claim 17, wherein the instructions are further executable by the one or more processors to cause the apparatus to:
determine the feedback resource configuration such that none of the multiple feedback resource sets overlap.

20. The apparatus of claim 17, wherein the instructions are further executable by the one or more processors to cause the apparatus to:
determine the first and second feedback resource sets for the UE to use for providing feedback for the first and second data transmissions such that the first and second feedback resource sets are exclusive of each other in a time domain.

21. The apparatus of claim 17, wherein the instructions to transmit the feedback resource configuration comprise instructions executable by the one or more processors to cause the apparatus to:
transmit the feedback resource configuration via radio resource control (RRC) signaling.

22. The apparatus of claim 17, wherein the instructions to transmit the indications of the first feedback resource set, the first feedback timing parameter, the second feedback resource set, and the second feedback timing parameter comprise instructions executable by the one or more processors to cause the apparatus to:
transmit one or more feedback resource indicators.

* * * * *